(12) United States Patent
Kim et al.

(10) Patent No.: US 12,523,339 B2
(45) Date of Patent: Jan. 13, 2026

(54) MOVABLE DISPLAY DEVICE WITH RAILS AND MOTORS

(71) Applicant: LG ELECTRONICS INC., Seoul (KR)

(72) Inventors: Yunjoo Kim, Seoul (KR); Jemin Woo, Seoul (KR); Juyoung Choi, Seoul (KR); Chulyoon Jung, Seoul (KR); Jaewoo Kim, Seoul (KR); Jusik Heo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 307 days.

(21) Appl. No.: 18/024,332

(22) PCT Filed: Sep. 3, 2020

(86) PCT No.: PCT/KR2020/011886
§ 371 (c)(1),
(2) Date: Mar. 2, 2023

(87) PCT Pub. No.: WO2022/050446
PCT Pub. Date: Mar. 10, 2022

(65) Prior Publication Data
US 2023/0313940 A1    Oct. 5, 2023

(51) Int. Cl.
*F16M 11/42* (2006.01)
*F16M 11/04* (2006.01)
*F16M 11/18* (2006.01)
*F16M 11/20* (2006.01)
(Continued)

(52) U.S. Cl.
CPC ......... *F16M 11/425* (2013.01); *F16M 11/046* (2013.01); *F16M 11/18* (2013.01); *F16M 11/2014* (2013.01); *F16M 11/2092* (2013.01); *F16M 11/26* (2013.01); *F16M 13/022* (2013.01); *F16M 13/027* (2013.01)

(58) Field of Classification Search
CPC .. G06F 1/1624; G06F 3/04847; G06F 1/1605; F16M 11/425; F16M 11/046; F16M 11/18
See application file for complete search history.

(56) References Cited

U.S. PATENT DOCUMENTS

| | | | |
|---|---|---|---|
| 2006/0151411 A1* | 7/2006 | Montesinos Alonso | ..................... G09F 15/00 211/162 |
| 2007/0158522 A1* | 7/2007 | Shahrokhi | ............... F16G 13/16 248/429 |
| 2021/0392765 A1* | 12/2021 | Pyo | ......................... G06F 1/181 |

FOREIGN PATENT DOCUMENTS

| | | |
|---|---|---|
| CN | 102053629 A | 5/2011 |
| CN | 207663679 U | 7/2018 |
| CN | 209654909 U | 11/2019 |

(Continued)

*Primary Examiner* — Allen L Parker
*Assistant Examiner* — Dakota M Talbert
(74) *Attorney, Agent, or Firm* — Birch, Stewart, Kolasch & Birch, LLP

(57) ABSTRACT

Disclosed is a display device. The display device of the present disclosure includes: a rail which extends long; a moving wall which extends long in a direction intersecting the rail and has a display panel; and a rod which is positioned between the rail and the moving wall; wherein one end of the rod is coupled to the rail to be movable in a length direction of the rail, and the other end of the rod is fixed to the moving wall, wherein the moving wall is movable in the length direction of the rail.

14 Claims, 23 Drawing Sheets

(51) Int. Cl.
*F16M 11/26* (2006.01)
*F16M 13/02* (2006.01)

(56) References Cited

FOREIGN PATENT DOCUMENTS

| | | |
|---|---:|---:|
| CN | 209839603 U | 12/2019 |
| CN | 210777614 U | 6/2020 |
| EP | 1 602 305 A1 | 12/2005 |
| JP | 2015-226289 A | 12/2015 |
| KR | 20-1999-0032452 U | 7/1999 |
| KR | 20-0291393 Y1 | 10/2002 |
| KR | 20-0351256 Y1 | 5/2004 |
| KR | 10-2005-0052486 A | 6/2005 |
| KR | 10-0772149 B1 | 10/2007 |
| KR | 10-2009-0064695 A | 6/2009 |
| KR | 10-1491733 B1 | 3/2015 |
| KR | 10-2020-0018214 A | 2/2020 |
| WO | WO 2006/124785 A2 | 11/2006 |

\* cited by examiner

[FIG. 1]
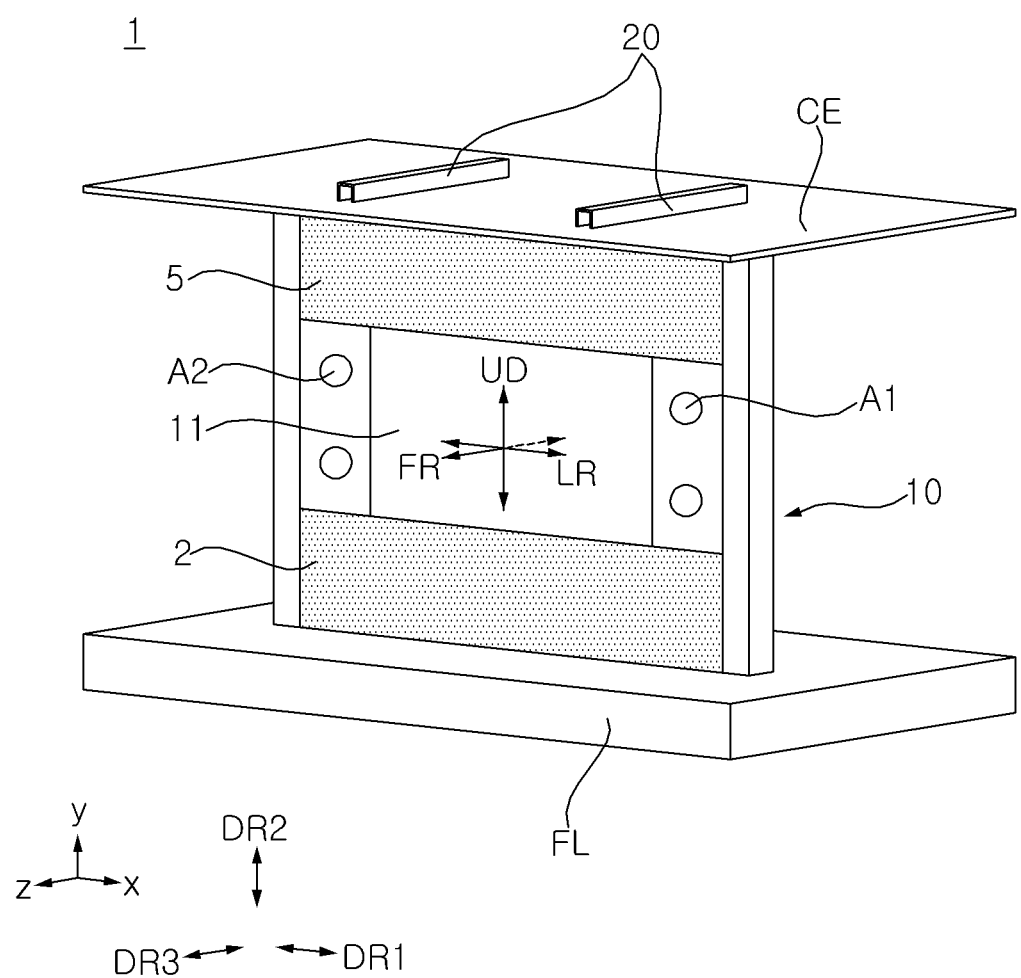

[FIG. 2]
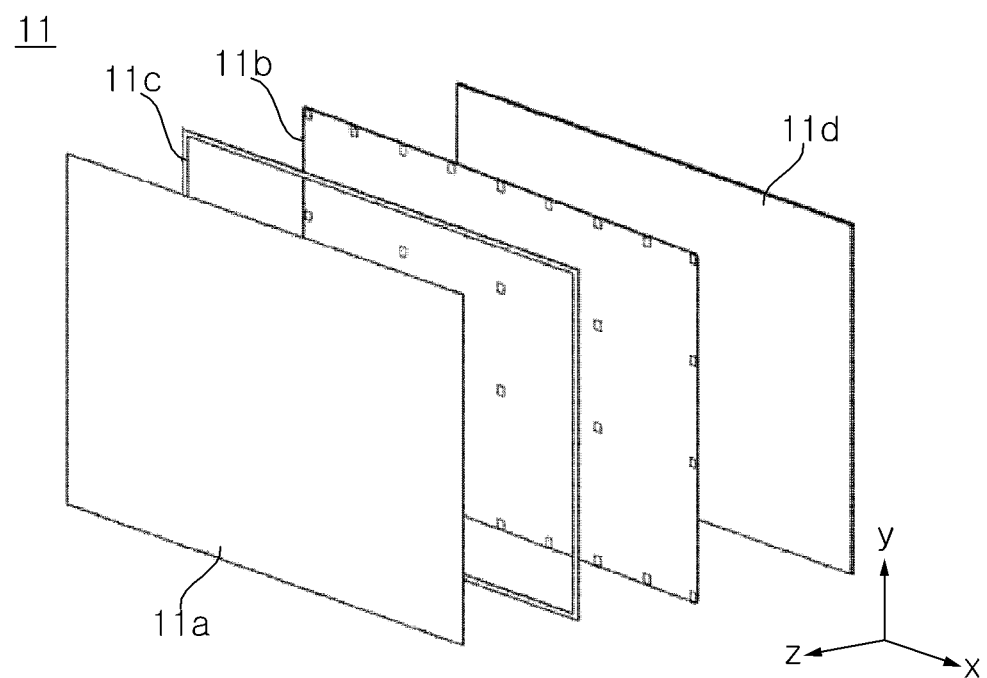

[FIG. 3]
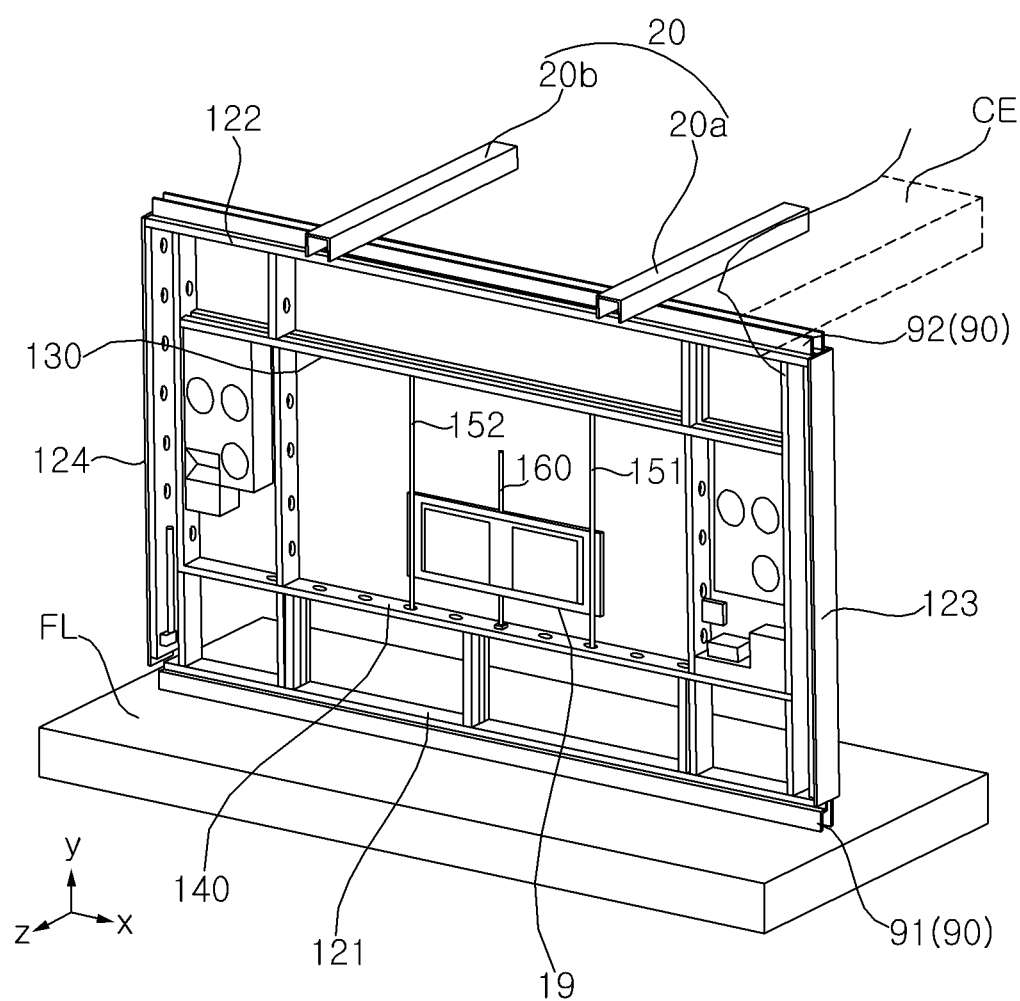

[FIG. 4]
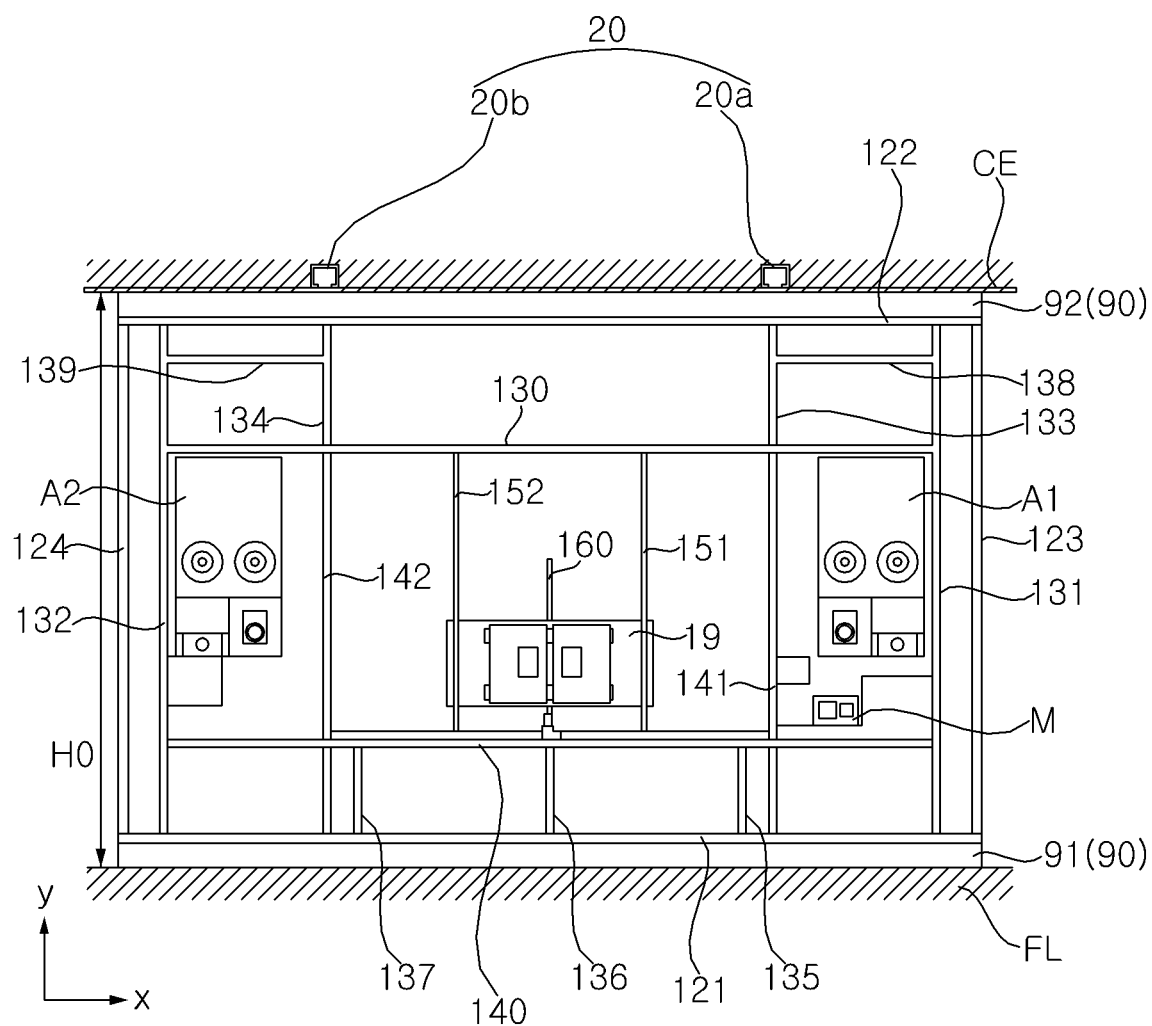

[FIG. 5]
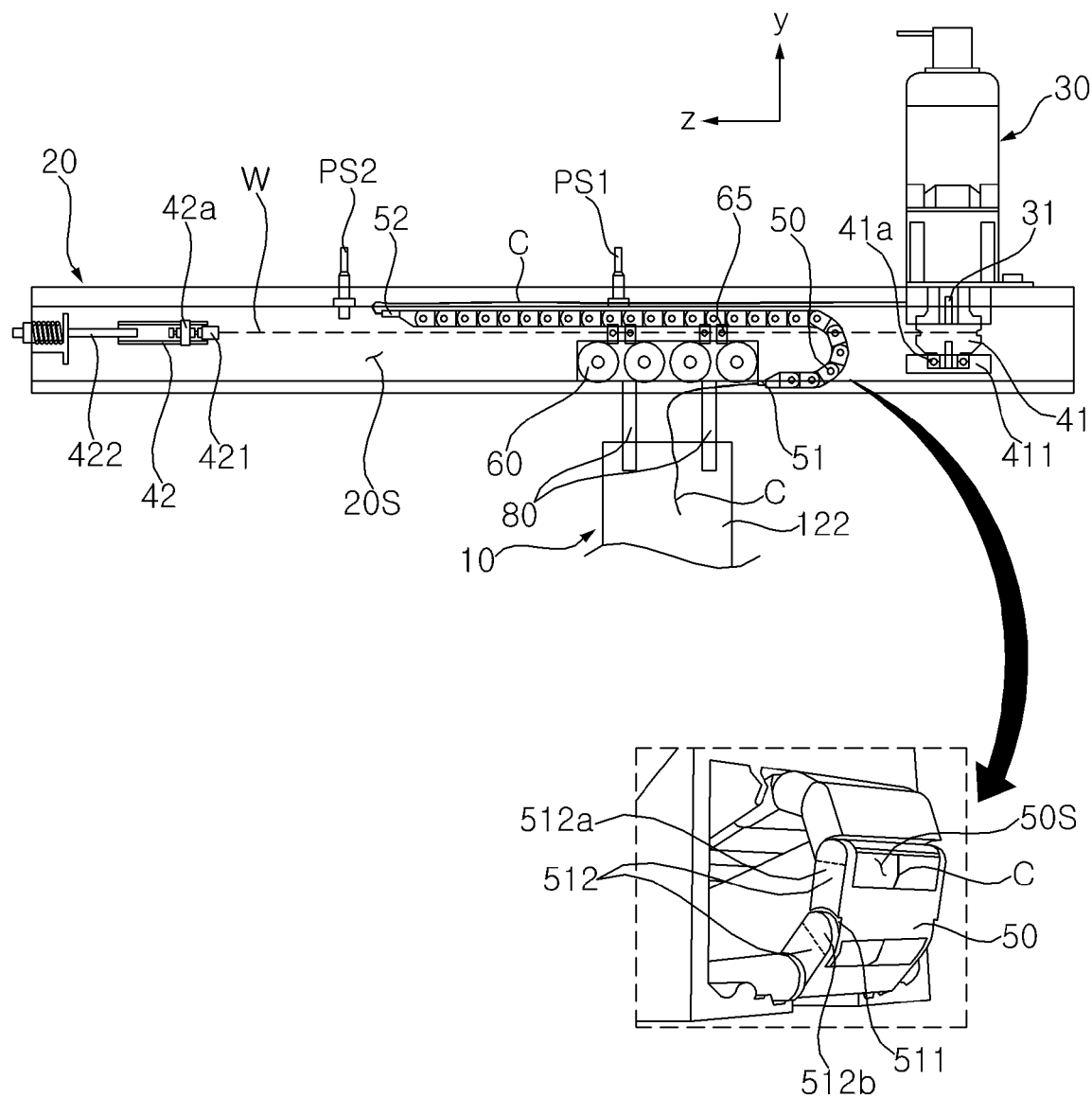

[FIG. 6]
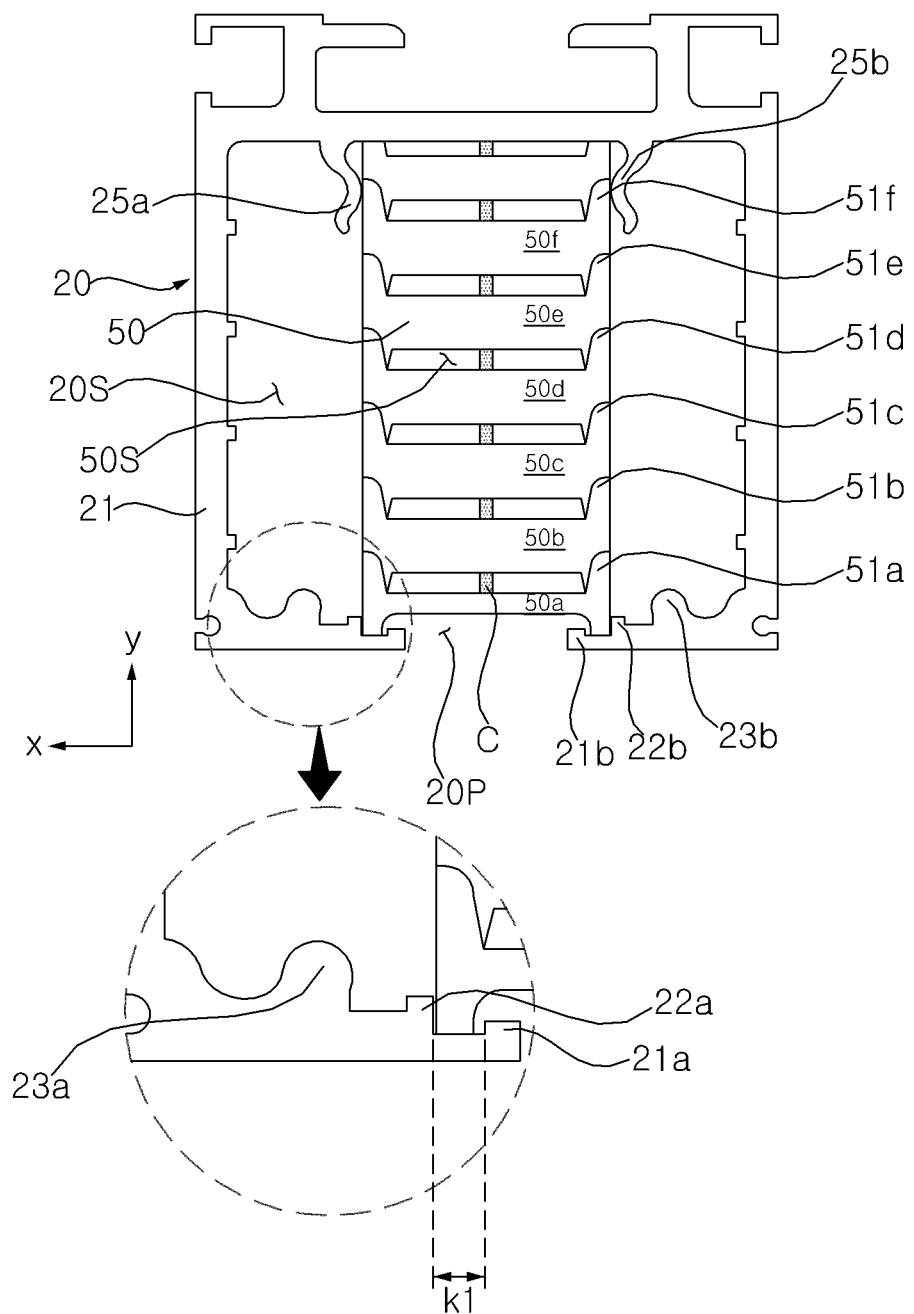

[FIG. 7]
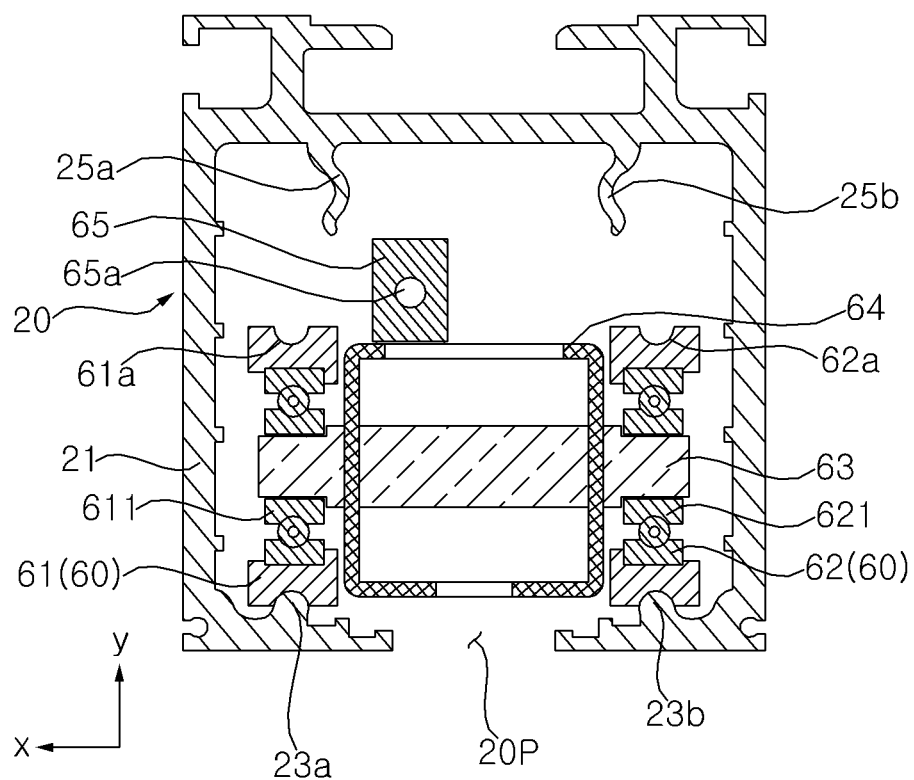

[FIG. 8]
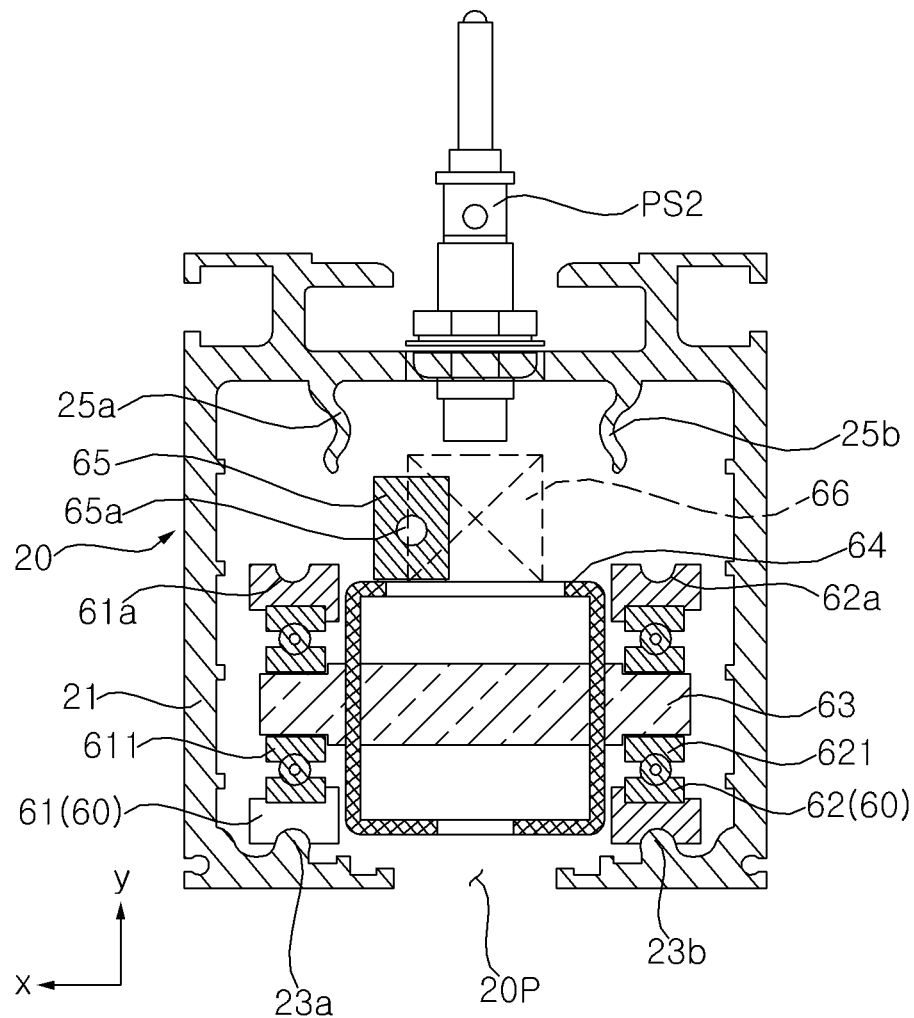

[FIG. 9]
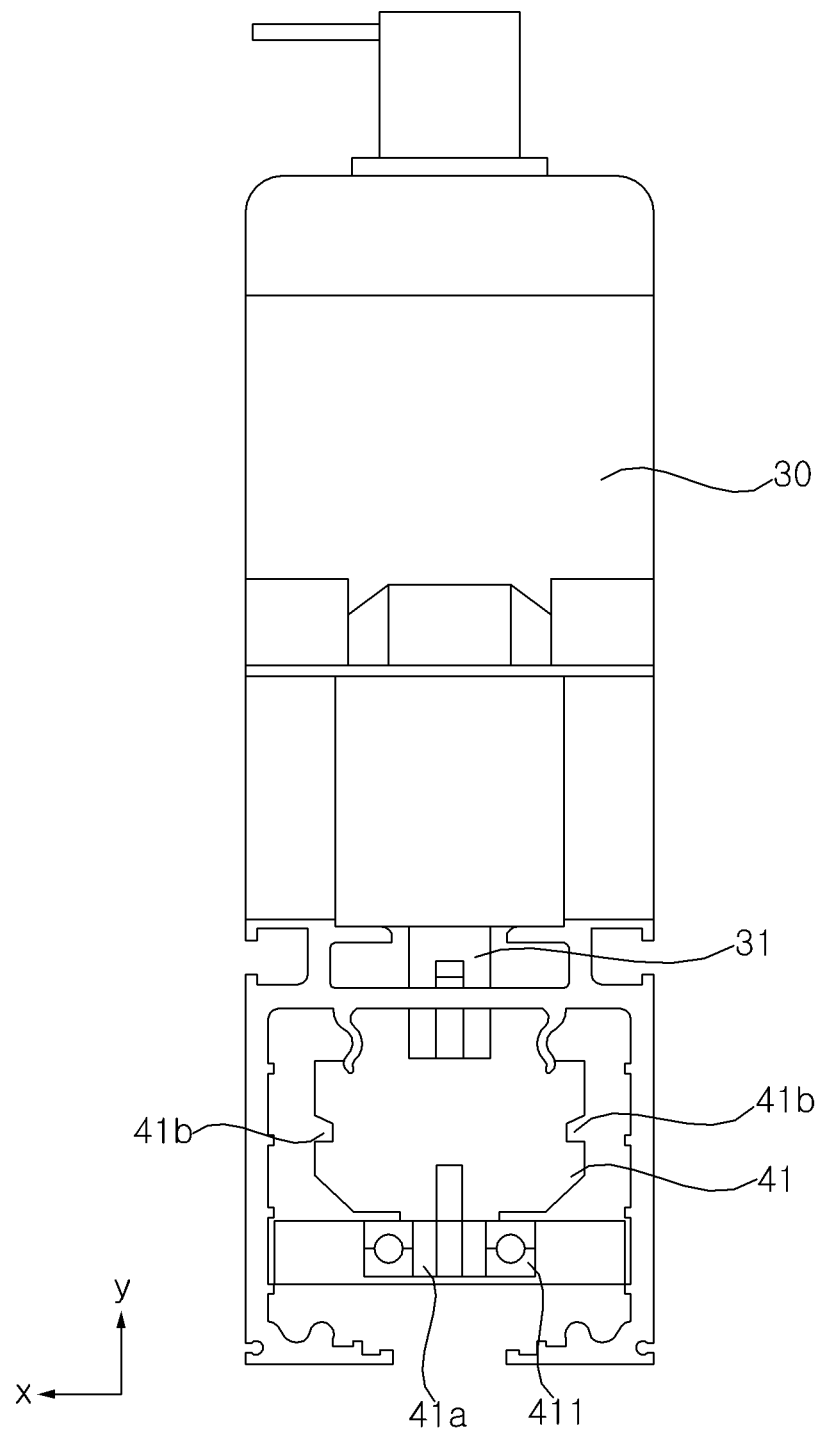

[FIG. 10]
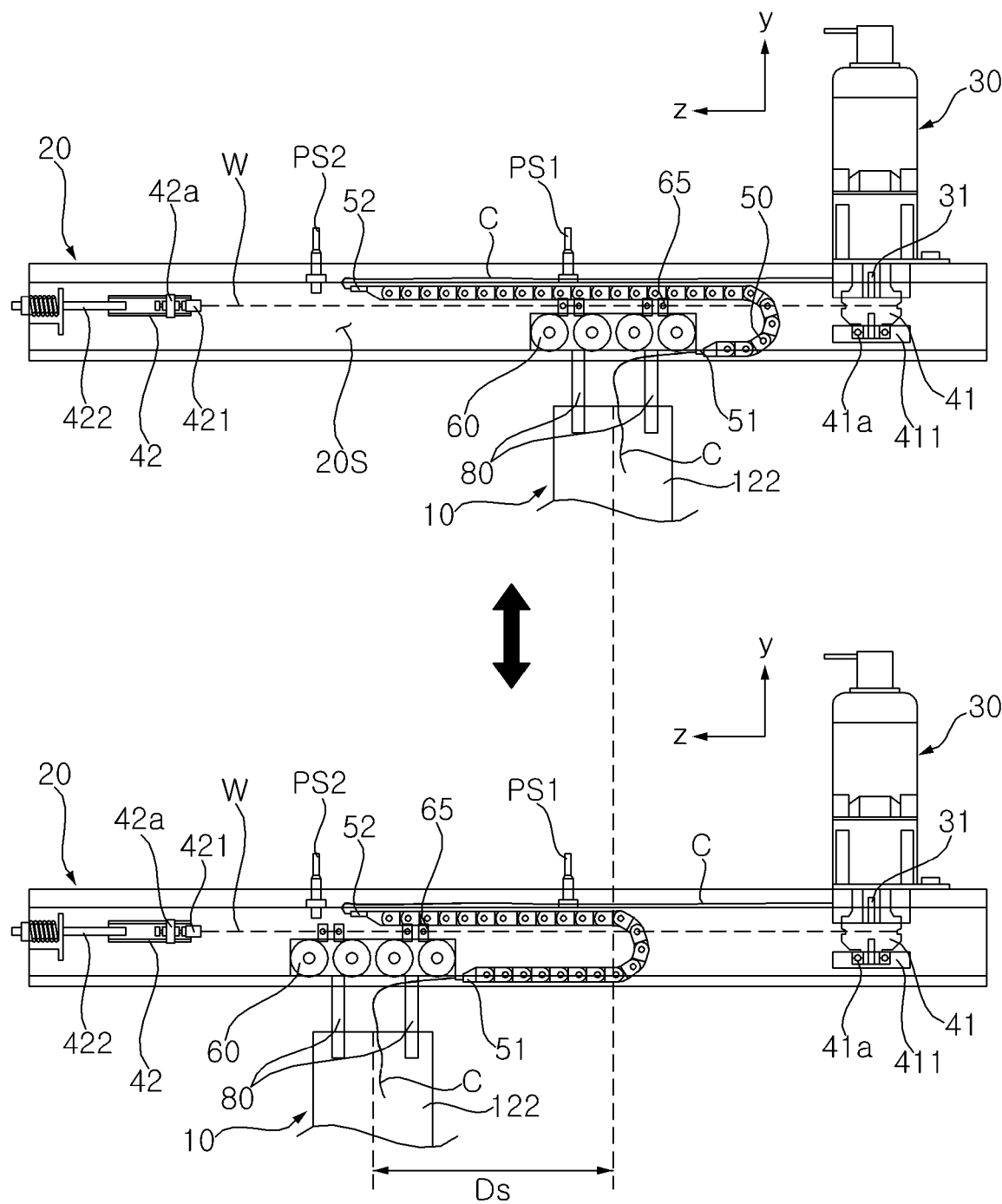

[FIG. 11]
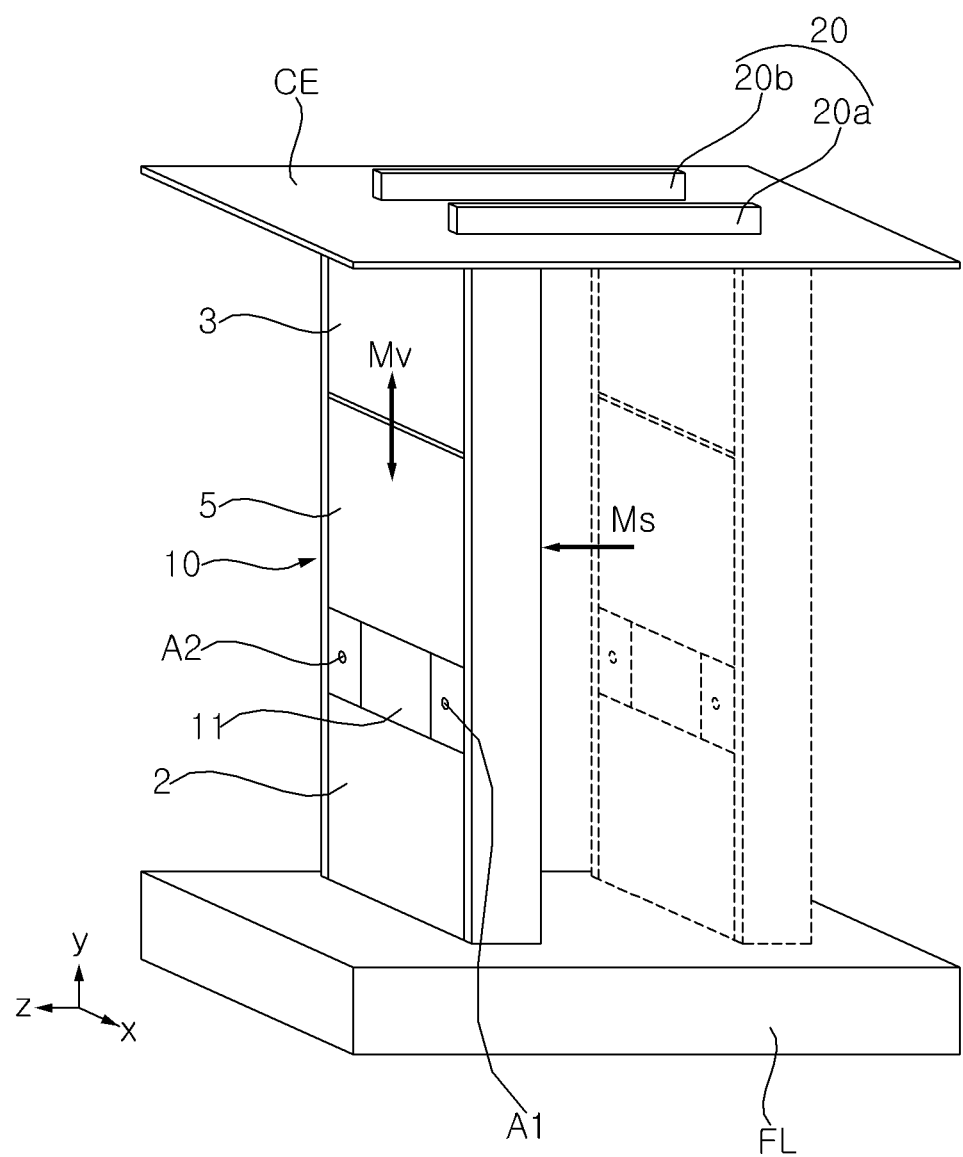

[FIG. 12]
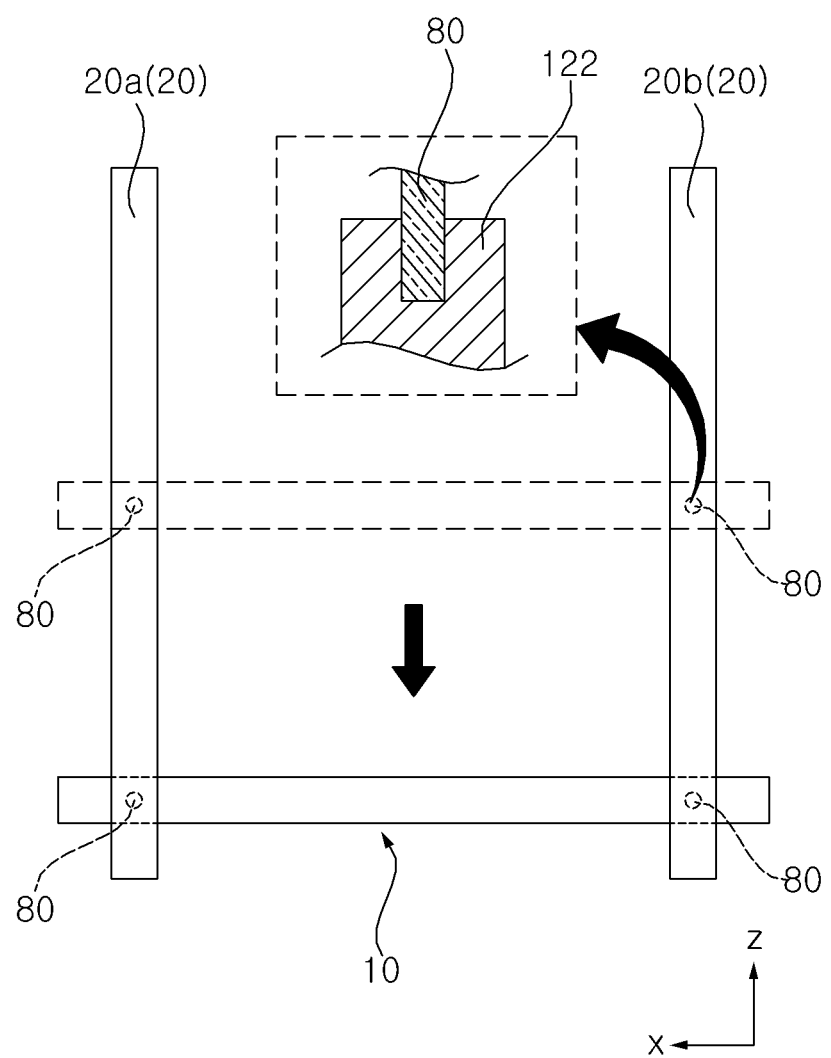

[FIG. 13]
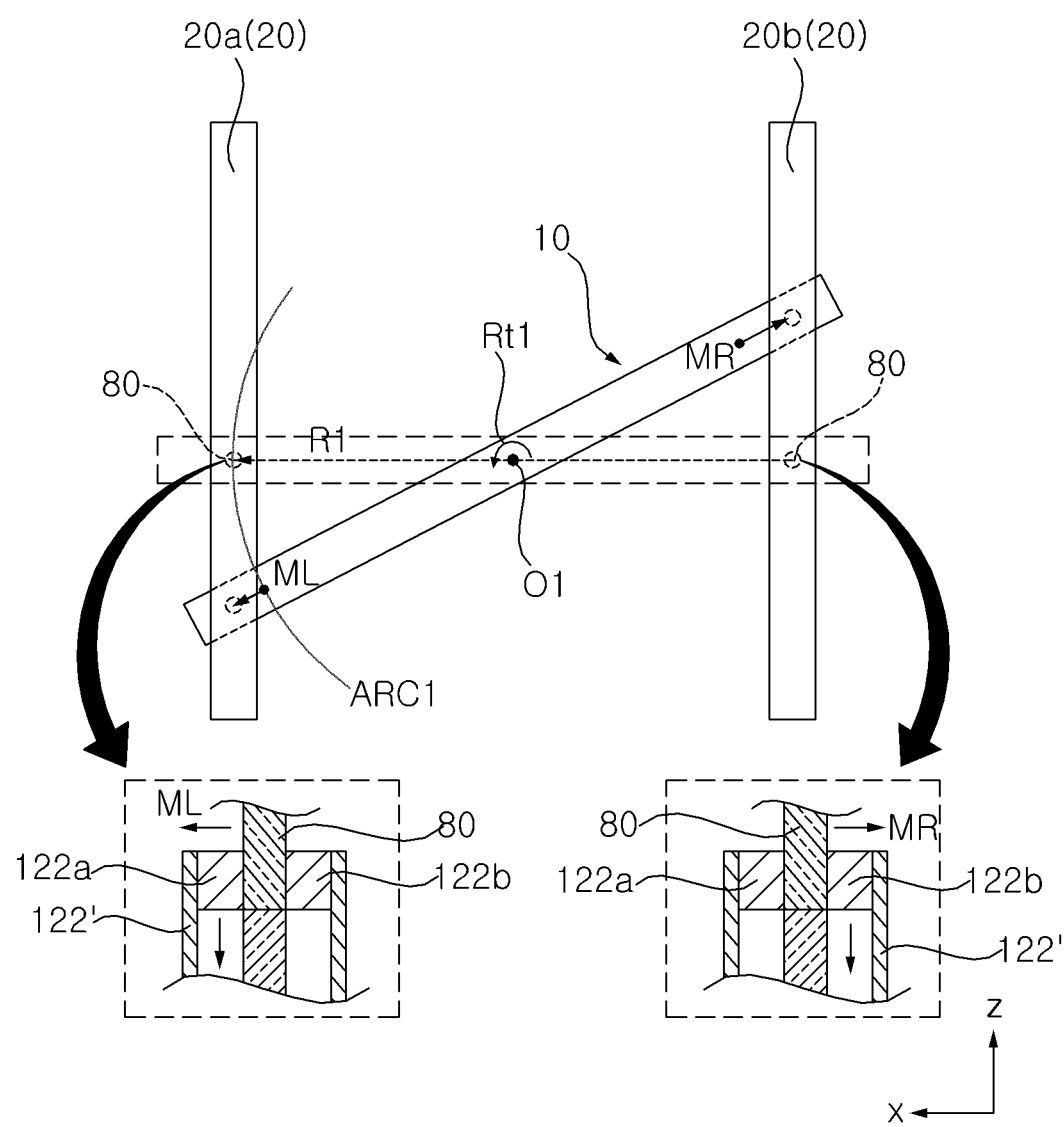

[FIG. 14]
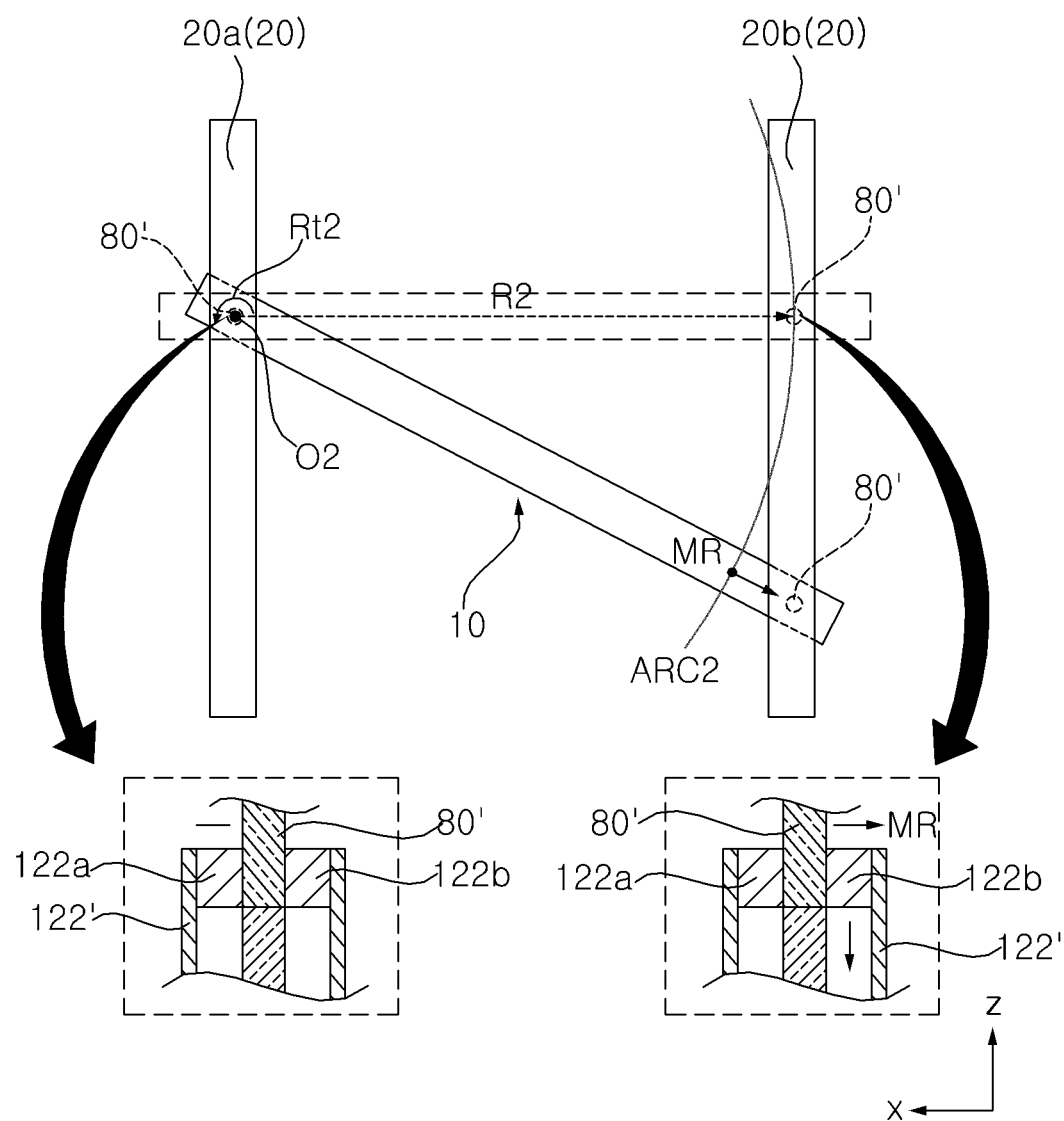

[FIG. 15]
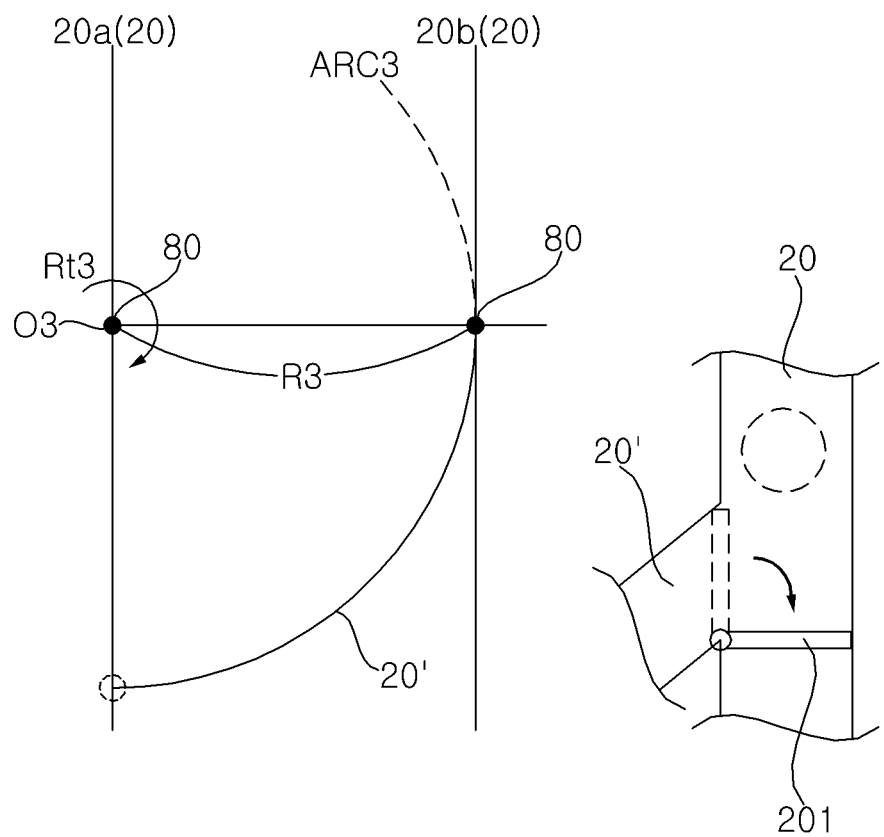

[FIG. 16]
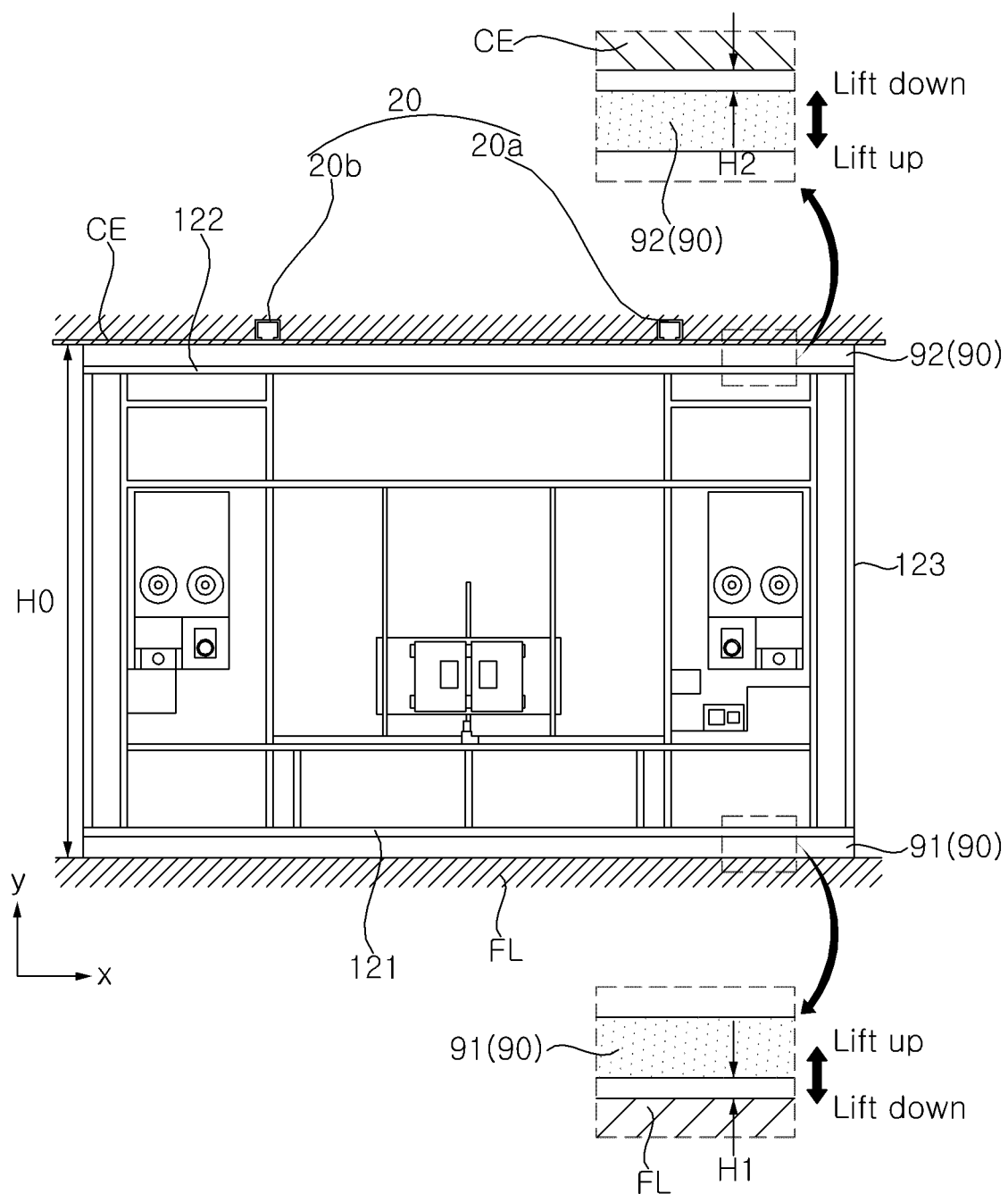

[FIG. 17]
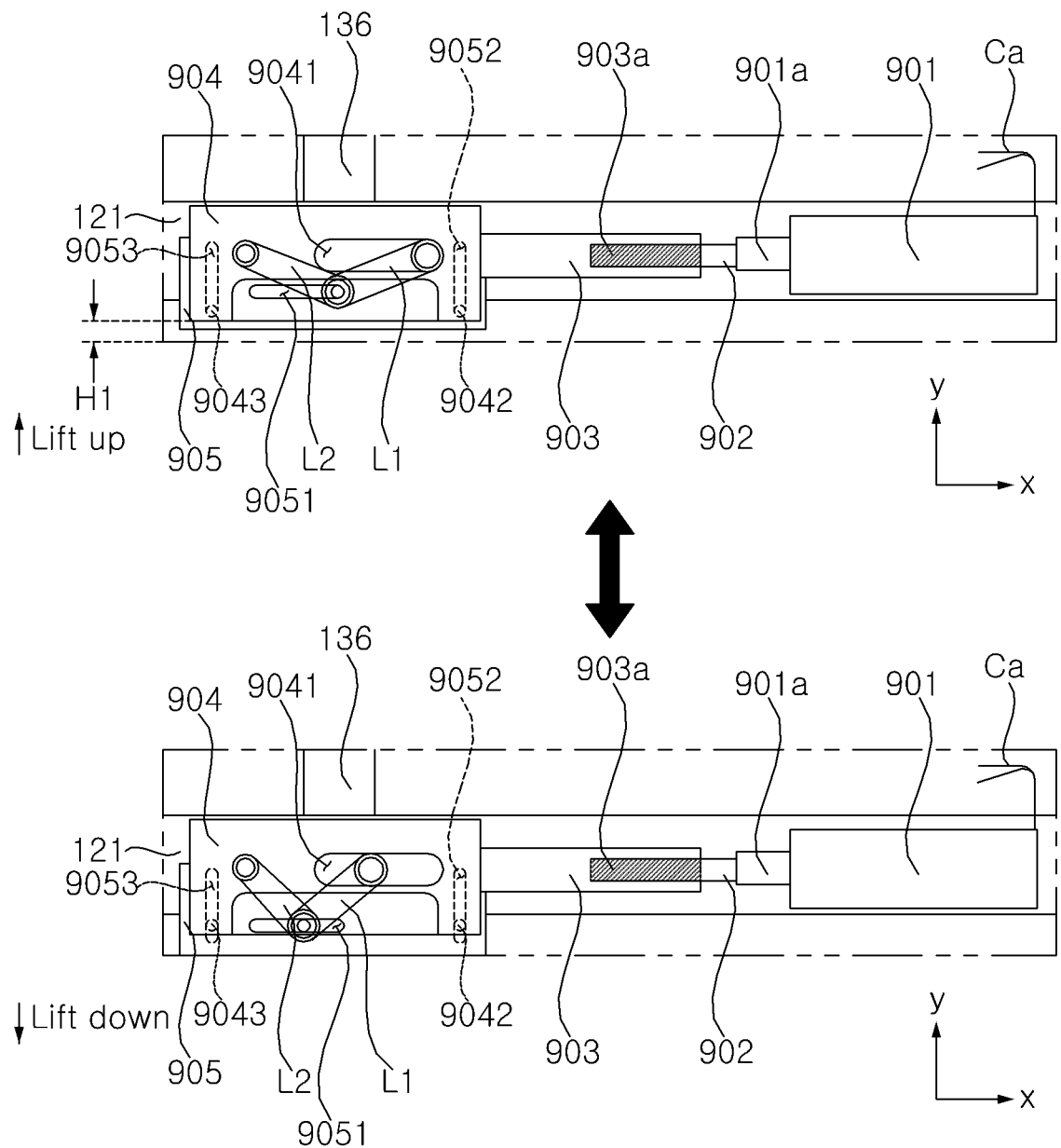

[FIG. 18]
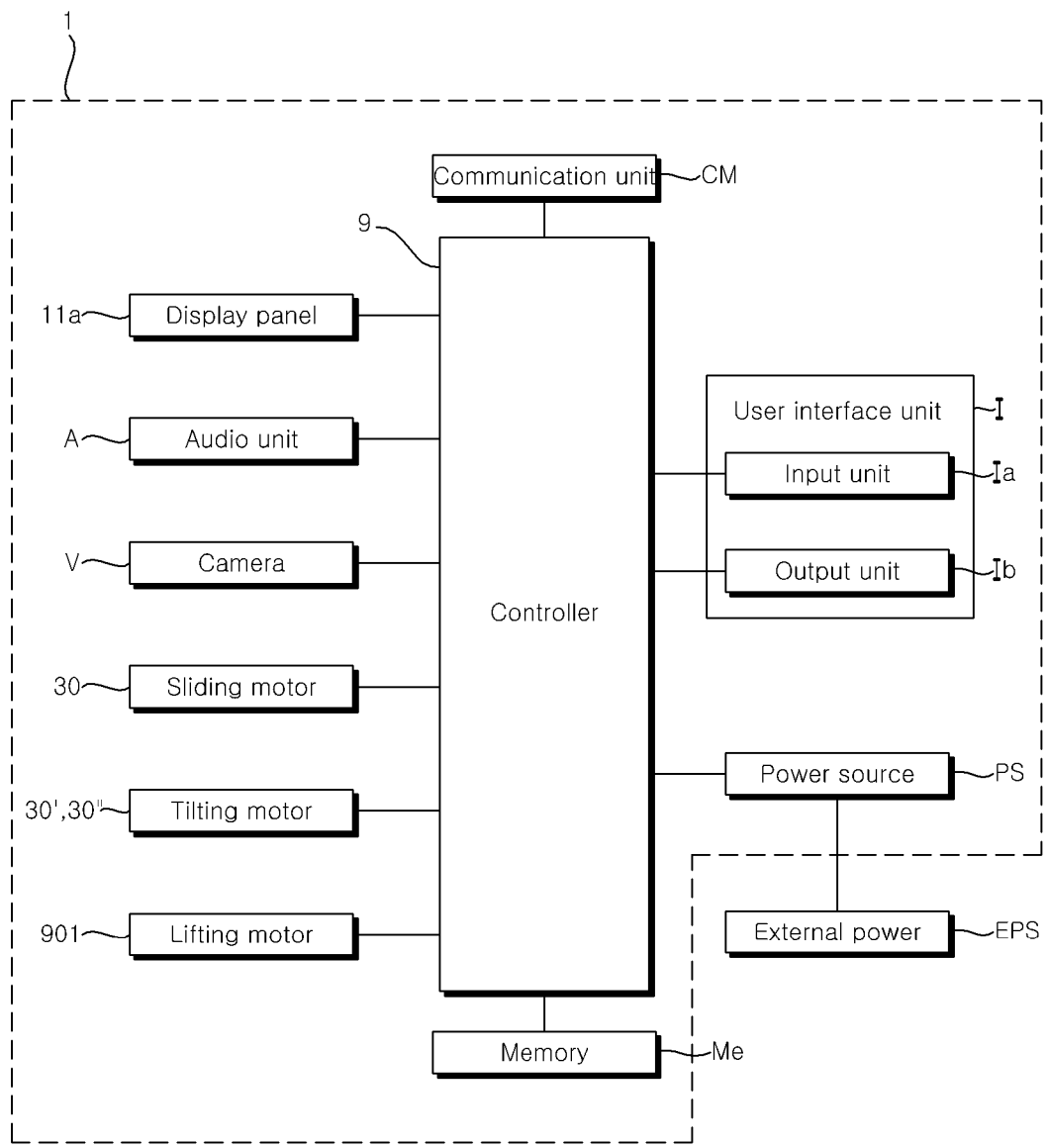

[FIG. 19]
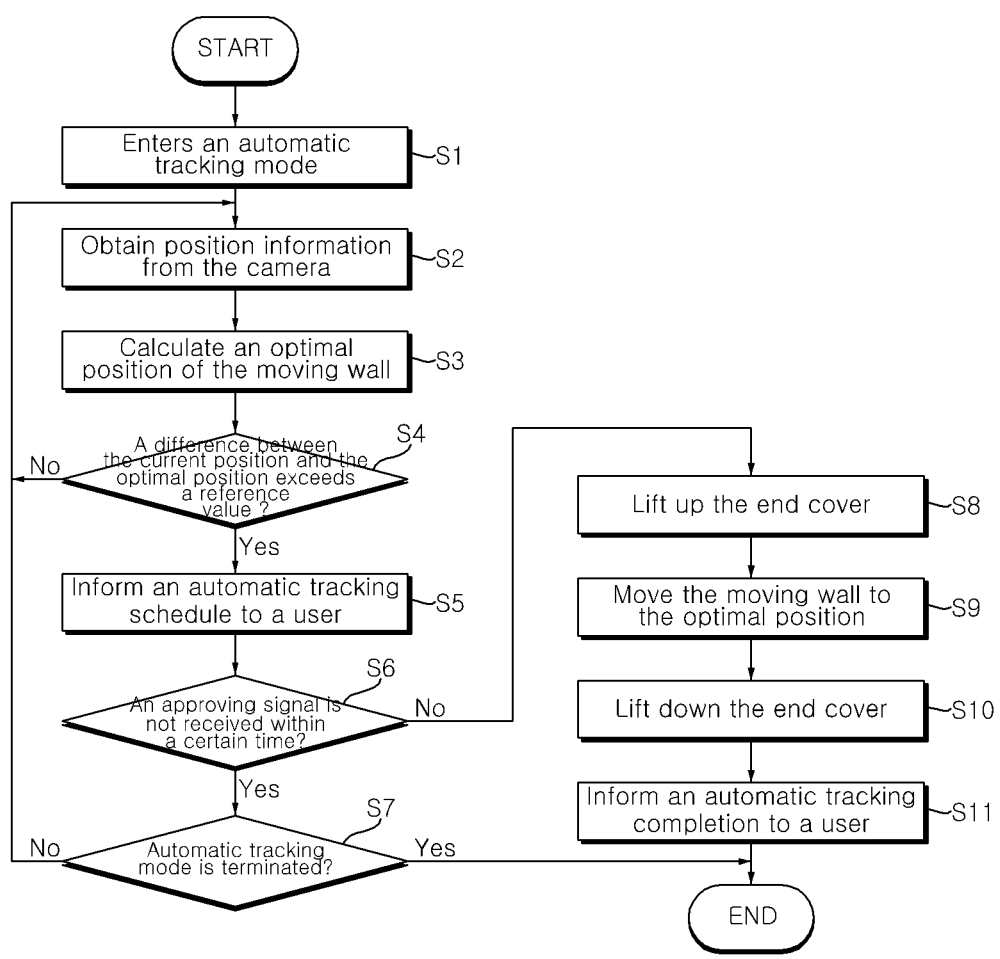

[FIG. 20]
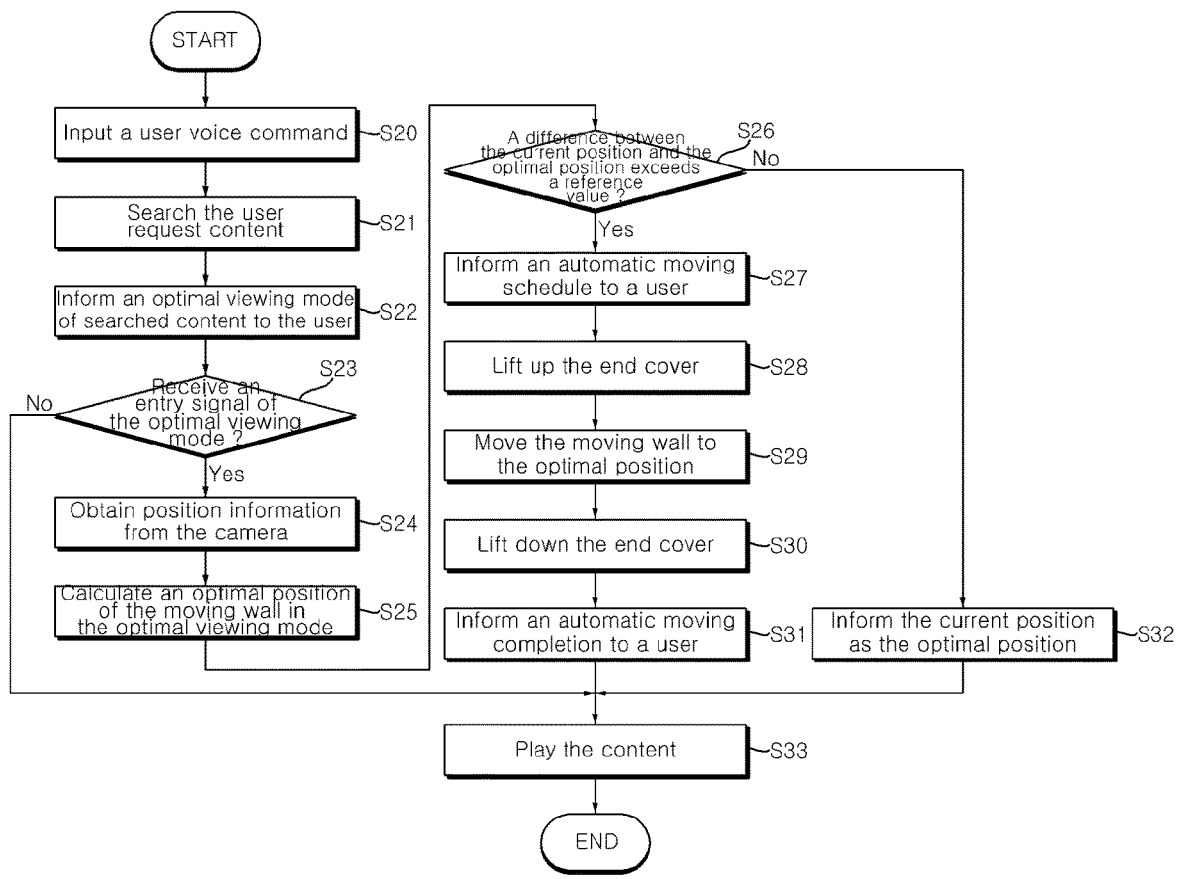

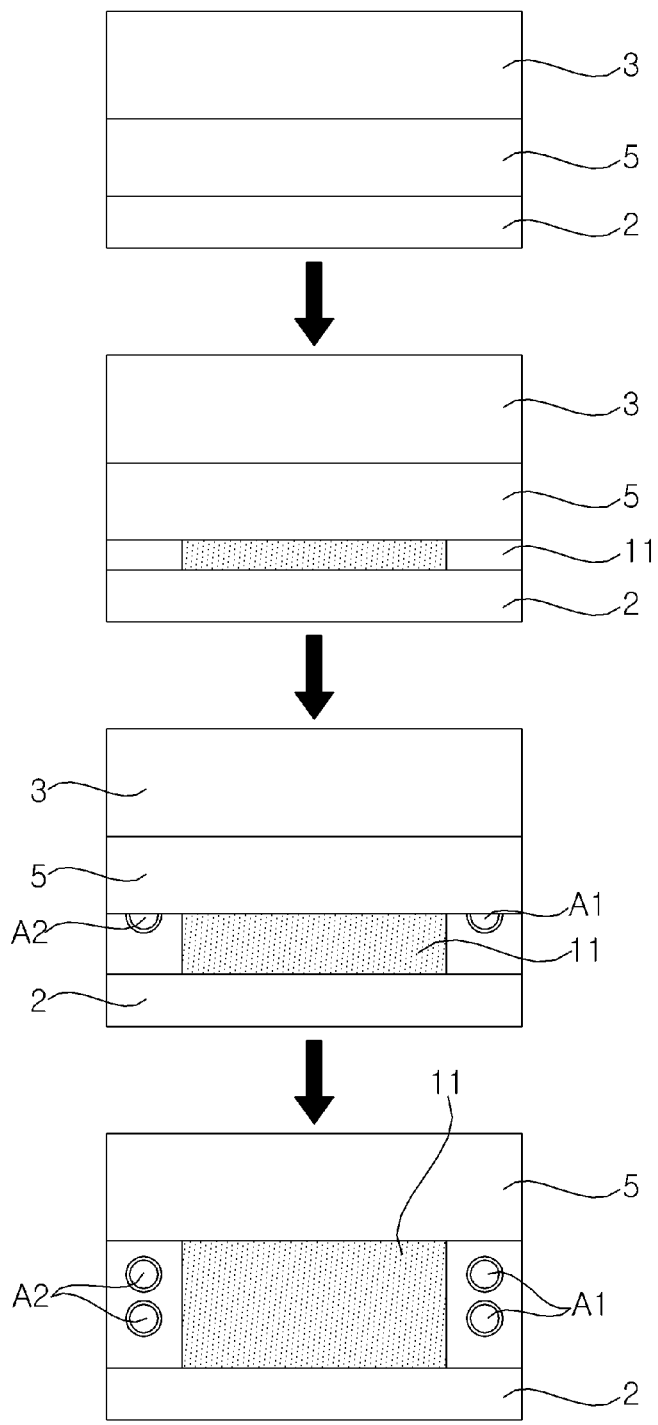
[FIG. 21]

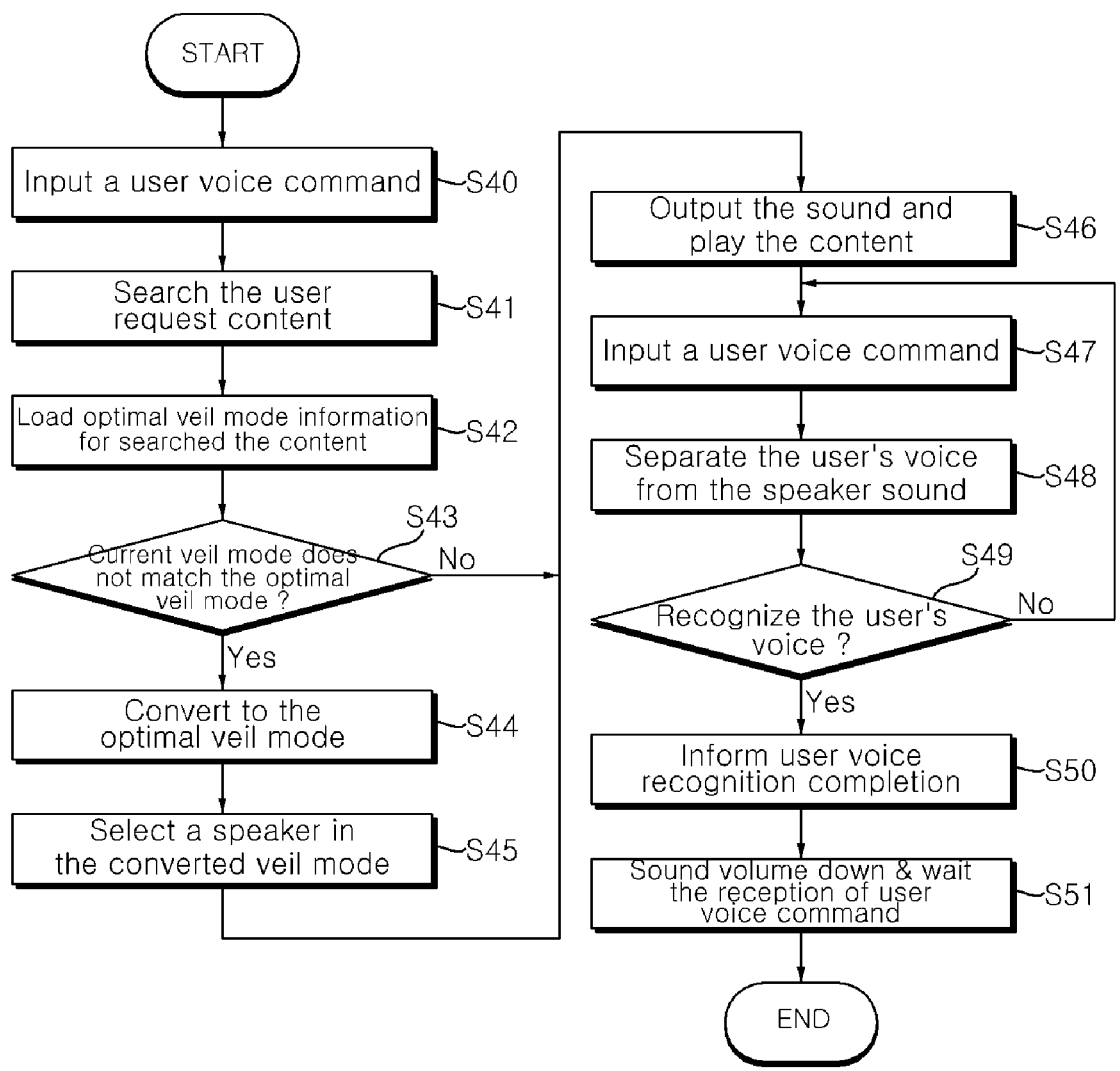
[FIG. 22]

[FIG. 23]
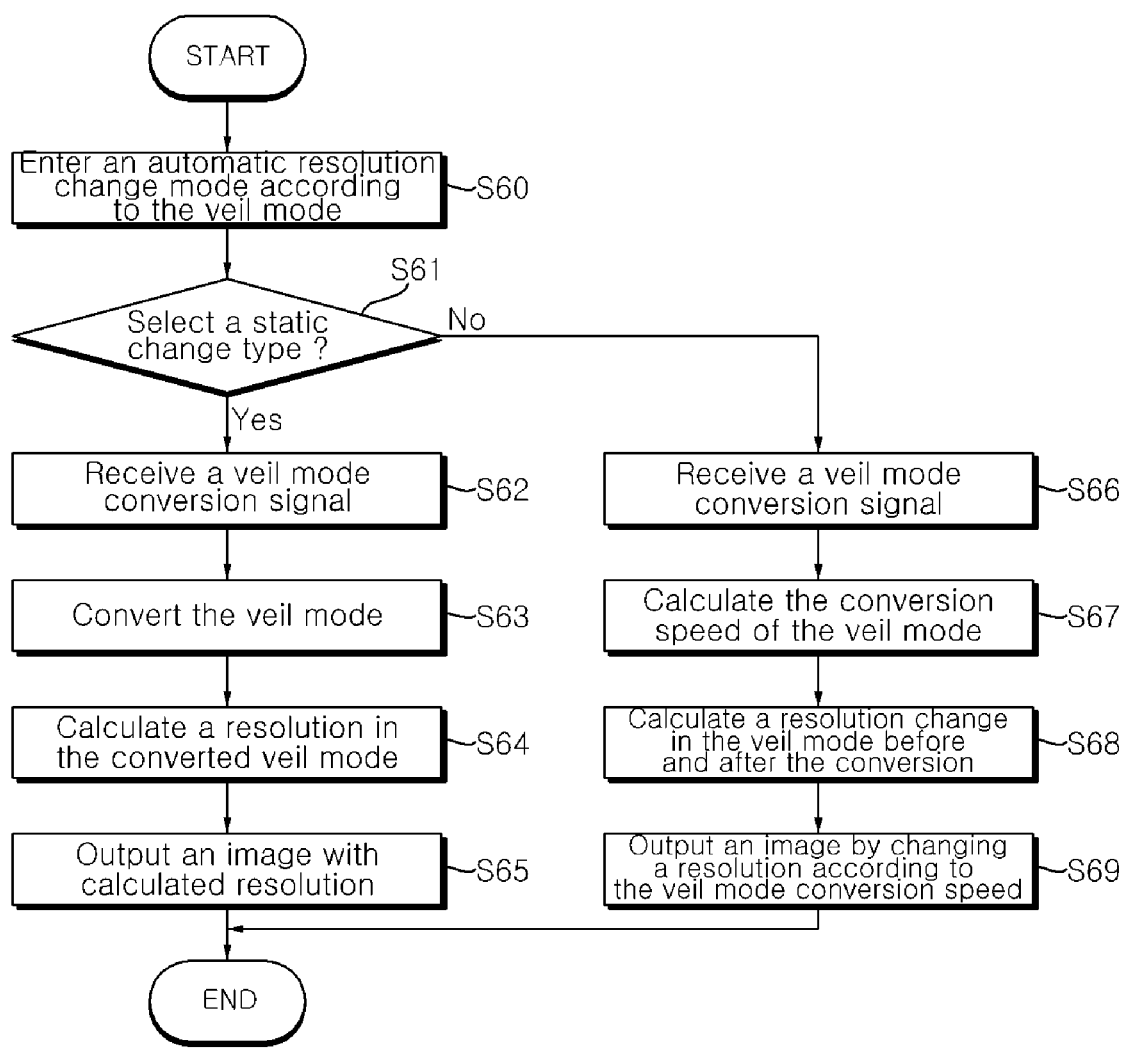

MOVABLE DISPLAY DEVICE WITH RAILS AND MOTORS

CROSS REFEENCE TO RELATED APPLICATIONS

This application is the National Phase of PCT International Application No. PCT/KR2020/011886, filed on Sep. 3, 2020, all of which is hereby expressly incorporated by reference into the present application.

TECHNICAL FIELD

The present disclosure relates to a display device. In particular, the present disclosure relates to a display device that has a display panel, and is movable along an elongated rail.

BACKGROUND ART

As the information society develops, the demand for display devices is also increasing in various forms. In correspondence with this, various display devices such as Liquid Crystal Display Device (LCD), Plasma Display Panel (PDP), Electro luminescent Display (ELD), Vacuum Fluorescent Display (VFD), and Organic Light Emitting Diode (OLED) have been researched and used in recent years.

Among them, an LCD panel includes a TFT substrate and a color substrate that face each other with a liquid crystal layer interposed therebetween, and may display an image by using light provided from a backlight unit. In addition, an OLED panel may display an image by depositing an organic material layer capable of emitting light by itself on a substrate on which a transparent electrode is formed.

Meanwhile, as a conventional display device is installed on a fixed body such as an indoor wall, there is a problem in that it is difficult to adjust the position of a display panel in correspondence with a distance between a user and the display panel.

DISCLOSURE OF INVENTION

Technical Problem

An object of the present disclosure is to solve the above and other problems.

Another object of the present disclosure is to provide a display device that is movable along a rail extending long while having a display panel.

Another object of the present disclosure is to provide a display device that has a wall partitioning an indoor space, and as the wall is movably provided, can partition an indoor space in various ways.

Another object of the present disclosure is to provide a display device capable of automatically moving a moving wall provided with a display panel to a position suitable for viewing an image in correspondence with a user's position.

Another object of the present disclosure is to provide a display device capable of adjusting the degree of forward exposure of a display panel by a veil provided in a moving wall and, in correspondence with this, automatically adjusting the resolution or size of an image of the display panel.

Technical Solution

According to an aspect of the present disclosure for achieving the above or other objects, provided is a display device including a rail which extends long; a moving wall which extends long in a direction intersecting the rail and has a display panel; and a rod which is positioned between the rail and the moving wall; wherein one end of the rod is coupled to the rail to be movable in a length direction of the rail, and the other end of the rod is fixed to the moving wall, wherein the moving wall is movable in the length direction of the rail.

Advantageous Effects

According to at least one embodiment of the present disclosure, it is possible to provide a display device that is movable along a rail extending long while having a display panel.

According to at least one embodiment of the present disclosure, it is possible to provide a display device that has a wall partitioning an indoor space, and as the wall is movably provided, can partition an indoor space in various ways.

According to at least one embodiment of the present disclosure, it is possible to provide a display device capable of automatically moving a moving wall provided with a display panel to a position suitable for viewing an image in correspondence with a user's position.

According to at least one embodiment of the present disclosure, it is possible to provide a display device capable of adjusting the degree of forward exposure of a display panel by a veil provided in a moving wall and, in correspondence with this, automatically adjusting the resolution or size of an image of the display panel.

Further scope of applicability of the present disclosure will become apparent from the following detailed description. However, it should be understood that the detailed description and specific embodiments such as preferred embodiments of the present disclosure are given by way of example only, since various changes and modifications within the spirit and scope of the present disclosure may be clearly understood by those skilled in the art.

BRIEF DESCRIPTION OF DRAWINGS

FIGS. 1 to 23 are diagrams illustrating examples of a display device according to embodiments of the present disclosure.

MODE FOR CARRYING OUT THE INVENTION

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In general, suffixes such as "module" and "unit" may be used to refer to elements or components. Use of such suffixes herein is merely intended to facilitate description of the specification, and the suffixes do not have any special meaning or function.

In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are only used to distinguish one element from another).

It will be understood that when an element is referred to as being "connected with" another element, there may be intervening elements present. In contrast, it will be understood that when an element is referred to as being "directly connected with" another element, there are no intervening elements present.

A singular representation may include a plural representation unless context clearly indicates otherwise.

In the present application, it should be understood that the terms "comprises, includes," "has," etc. specify the presence of features, numbers, steps, operations, elements, components, or combinations thereof described in the specification, but do not preclude the presence or addition of one or more other features, numbers, steps, operations, elements, components, or combinations thereof).

Referring to FIG. 1, a display device 1 may include a moving wall 10 equipped with a display unit 11. For example, the moving wall 10 may be positioned between a floor FL and a ceiling CE of a room. In this case, the moving wall 10 may extend long in an up-down direction (UD). In addition, the moving wall 10 may be moved in a front-rear direction FR along a rail 20 installed on the ceiling CE, which will be described in more detail later.

The display unit 11 may be provided on a front surface of the moving wall 10. A direction in which the display unit 11 displays a screen may be referred to as a front direction, and a direction opposite to this may be referred to as a rear direction. In this case, each of a first audio unit A1 and a second audio unit A2 may be provided in the left and right sides of the display unit 11 to output sound. In addition, a lower part 2 may be provided in the lower side of the display unit 11 to cover at least a portion of the lower portion of the moving wall 10. In addition, a veil 5 is provided in a front direction of the display unit 11, and may expose the front direction of the display unit 11 to the outside or may cover at least a portion of the front direction of the display unit 11 while moving in an up-down direction UD.

Meanwhile, the aforementioned left-right direction LR may be referred to as a first direction DR1, the up-down direction UD may be referred to as a second direction DR2, and the front-rear direction FR may be referred to as a third direction DR3.

Hereinafter, it is described by way of an example that the display unit 11 is provided with a display panel using an organic light emitting diode (OLED), but various panels such as LCD may be applied as the display panel applicable to the present disclosure.

Referring to FIG. 2, the display unit 11 may include a display panel 11a, a frame 11b, a middle frame 11c, and a back cover 11d. Meanwhile, the display panel 11a may be an OLED panel, and in this case, the display unit 11 does not require a backlight unit, so it has an advantage that it can be implemented in an ultra-thin shape.

The display panel 11a may form the front surface of the display unit 11, and display an image in the front direction. The display panel 11a may divide an image into a plurality of pixels and output an image by matching color, brightness, and saturation for each pixel. The display panel 11a may be divided into an active area in which an image is displayed and a de-active area in which an image is not displayed. The display panel 11a may generate light corresponding to a color of red, green, or blue according to a control signal.

The frame 11b may be positioned in the rear direction of the display panel 11a. The frame 11b may be formed in the shape of a rectangular frame as a whole. A printed circuit board (PCB) on which a plurality of electronic devices are mounted may be coupled to the frame 11b. Meanwhile, the frame 11b may be referred to as a main frame or a module cover.

The middle frame 11c may form a side surface of the display unit 11. The middle frame 11c may be coupled to the display panel 11a and the frame 11b at between the display panel 11a and the frame 11b. For example, the middle frame 11c may include a metal material. Accordingly, the middle frame 11c may improve torsional rigidity and/or bending rigidity of the display unit 11. Meanwhile, the middle frame 11c may be referred to as a side frame, a middle cabinet, or a panel guide.

The back cover 11d may form a rear surface of the display unit 11. The back cover 11d may be coupled to the frame 11b in the rear direction of the frame 11b. For example, the back cover 11d may be an injection molding made of a resin material. As another example, the back cover 11d may include a metal material.

Referring to FIGS. 3 and 4, the moving wall 10 may include a frame forming a skeleton of the moving wall 10.

The frame may form a circumference of the moving wall 10, and may include an outer frame formed in the shape of a rectangular frame as a whole. The outer frame may include a first outer frame 121 forming a lower end of the outer frame, a second outer frame 122 forming an upper end of the outer frame, a third outer frame 123 forming a left end of the outer frame, and a fourth outer frame 124 forming a right end of the outer frame. In this case, the first outer frame 121 and the second outer frame 122 may extend in the left-right direction, and the third outer frame 123 and the fourth outer frame 124 may extend long in the up-down direction.

The frame may include an inner frame positioned inside the moving wall 10. The inner frame may include a horizontal inner frame 130 which is positioned in the lower side of the second outer frame 122, and extends long in the left-right direction. In this case, the left end of the horizontal inner frame 130 may be adjacent to the third outer frame 123, and the right end may be adjacent to the fourth outer frame 124. The inner frame may include a first inner frame 131 that is connected to the left end of the horizontal inner frame 130 and extends long in the up-down direction. In this case, the lower end of the first inner frame 131 may be coupled to the first outer frame 121, and the upper end may be coupled to the second outer frame 122. The inner frame may include a second inner frame 132 that is connected to the right end of the horizontal inner frame 130 and extends long in the up-down direction. In this case, the lower end of the second inner frame 132 may be coupled to the first outer frame 121, and the upper end may be coupled to the second outer frame 122. The inner frame may include a third inner frame 133 that is coupled to the second outer frame 122 and the horizontal inner frame 130 at between the second outer frame 122 and the horizontal inner frame 130, and is connected to the first inner frame through an eighth inner frame 138. The inner frame may include a fourth inner frame 134 that is coupled to the second outer frame 122 and the horizontal inner frame 130 at between the second outer frame 122 and the horizontal inner frame 130, and is coupled to the second inner frame through a ninth inner frame 139. The inner frame may include a fifth inner frame 135, a sixth inner frame 136, and a seventh inner frame 137 that are coupled to a horizontal under frame 140 and a first outer frame 121 at between a horizontal under frame 140 described later and a first outer frame 121, and spaced apart from each other in the left-right direction.

The frame may include an under frame in addition to the outer frame and the inner frame that are described above. The under frame may include a horizontal under frame 140 which is positioned above a first outer frame 121 and extends long in the left-right direction. In this case, the left end of the horizontal under frame 140 may be connected to the first inner frame 131, and the right end may be coupled to the second inner frame 132. The under frame may include a first under frame 141 that is coupled to the horizontal inner frame 130 and the first outer frame 121 at between the horizontal inner frame 130 and the first outer frame 121, perpendicular to the horizontal under frame 140, and faces the first inner frame 131. The under frame may include a second under frame 142 that is coupled to the horizontal inner frame 130 and the first outer frame 121 at between the horizontal inner frame 130 and the first outer frame 121, perpendicular to the horizontal under frame 140, and faces the second inner frame 132.

The bracket 19 may be coupled to a lead screw 160. For example, the lead screw 160 may be rotated in both directions by receiving a driving force from a motor 161. In addition, the bracket 19 may be vertically movably coupled to a first rod 151 and a second rod 152 that are spaced apart from each other in the left-right direction.

For example, the motor 161 may be installed in the horizontal under frame 140, and the lead screw 160 may extend upward from the motor 161. In addition, the first rod 151 and the second rod 152 extend long in the up-down direction, and may be coupled to the horizontal inner frame 130 and the horizontal under frame 140 at between the horizontal inner frame 130 and the horizontal under frame 140. In this case, when the lead screw 160 rotates in a first direction, the bracket 19 may move upward along a thread formed in the outer circumference of the lead screw 160. On the other hand, when the lead screw 160 rotates in a second direction opposite to the first direction, the bracket 19 may move downward along a thread formed in the outer circumference of the lead screw 160.

Meanwhile, a back cover 11*d* (see FIG. 2) may be detachably coupled to the bracket 19. Accordingly, the display unit 11 (see FIG. 2) may be disposed in a space partitioned by the horizontal inner frame 130, the first under frame 141, the horizontal under frame 140, and the second under frame 142 through the bracket 19.

Meanwhile, a first audio unit A1 may be disposed in a space partitioned by the horizontal inner frame 130, the first inner frame 131, the horizontal under frame 140, and the first under frame 141. In addition, a second audio unit A2 may be disposed in a space partitioned by the horizontal inner frame 130, the second under frame 142, the horizontal under frame 140, and the second inner frame 132. In this case, a microphone (M) may be installed on the horizontal under frame 140 adjacent to the first audio unit A1. Here, the microphone (M) may be a microphone (MIC) array.

Referring to FIGS. 3 and 5, the rail 20 may be positioned inside the ceiling CE. For example, the rail 20 may include a pair of rails 20*a* and 20*b* spaced apart from each other in the left-right direction. In this case, a sliding motor 30 may be installed in each of the pair of rails 20*a* and 20*b*. Meanwhile, in the display device 1, a single rail 20 may be provided, or three or more rails may be provided. Hereinafter, for a brief description, a rail positioned in the relatively left side among the pair of rails 20*a* and 20*b* will be described as a basis, but the description thereof may be similarly applied to a rail positioned in the relatively right side.

The rail 20 may extend long in the front-rear direction. The rail 20 may be connected to the second outer frame 122 of the moving wall 10 with the ceiling CE interposed therebetween through the rod 80. At this time, the rod 80 may extend long in the up-down direction, the upper end of the rod 80 may be fixed to a block 64 described later, and the other end of the rod 80 may be fixed to the second outer frame 122. Here, the block 64 may be coupled to a roller 60 which is disposed in the inner space of the rail 20 and movable in the front-rear direction. Accordingly, when the block 64 is moved in the front-rear direction together with the roller 60, the moving wall 10 fixed to the block 64 through the rod 80 may also be moved in the front-rear direction.

For example, the rod 80 may have a cylindrical shape as a whole, and a screw thread may be formed on the outer circumferential surface to be screw-coupled to the aforementioned block 64 and the second outer frame 122. For example, the rod 80 may include a pair of rods spaced apart from each other in the front-rear direction. Thus, the coupling stability between the rail 20 and the moving wall 10 through the rod 80 may be improved.

Referring to FIGS. 5 and 6, a body 21 of the rail 20 may form a side surface of the rail 20. The interior of the body 21 is penetrated in the front-rear direction, and may provide an internal accommodation space 20S formed to be elongated in the front-rear direction. For example, the body 21 may be formed in a rectangular pipe shape as a whole.

An opening 20P communicating with the internal accommodation space 20S may be formed in a portion of the lower surface of the body 21. The opening 20P may be formed between one end 21*a* and the other end 21*b* of the body 21. The opening 20P may be formed to be elongated in the front-rear direction. Meanwhile, the aforementioned rod 80 may penetrate the opening 20P. That is, the upper end of the rod 80 penetrating the opening 20P may be fixed to the block 64 in the internal accommodation space 20S, and the lower end of the rod 80 may be fixed to the second outer frame 122 at the lower side of the opening 20P.

Meanwhile, one end 21*a* of the body 21 may protrude from the body 21 toward the internal accommodation space 20S. In addition, the body 21 may include a first protrusion 22*a* that is spaced apart from one end 21*a* of the body 21 and protrudes from the body 21 toward the internal accommodation space 20S. In this case, a first seating portion k1 may be formed between one end 21*a* of the body 21 and the first protrusion 22*a*. Similarly, the other end 21*b* of the body 21 may protrude from the body 21 toward the internal accommodation space 20S. In addition, the body 21 may include a second protrusion 22*b* that is spaced apart from the other end 21*b* of the body 21 and protrudes from the body 21 toward the internal accommodation space 20S. In this case, the first seating portion k1 may be formed between the other end 21*b* of the body 21 and the second protrusion 22*b*.

Meanwhile, the body 21 may include a pair of ribs 25*a* and 25*b* that protrude from the upper inner surface of the body 21 toward the internal accommodation space 20S and are spaced apart from each other in the left-right direction. For example, the pair of ribs 25*a* and 25*b* may be bent at least once.

A trolley 50 described later may be seated in the first seating portion k1 between the pair of ribs 25*a* and 25*b* and installed in the internal accommodation space 20S. Accordingly, the movement in the left-right direction of the trolley 50 is restricted, and the trolley 50 may be stably disposed in the internal accommodation space 20S.

The trolley 50 may extend long. The trolley 50 may include a plurality of segments connected in series. For example, the plurality of segments may include a first segment 50a, a second segment 50b, a third segment 50c, a fourth segment 50d, a fifth segment 50e, and a sixth segment 50f that are sequentially connected. Each of a pair of first joints 51a may be provided in the left and right sides of the first segment 50a, respectively. Each of a pair of second joints 51b may be provided in the left and right sides of the second segment 50b, respectively. Each of a pair of third joints 51c may be provided in the left and right sides of the third segment 50c, respectively. Each of a pair of fourth joints 51d may be provided in the left and right sides of the fourth segment 50d, respectively. Each of a pair of fifth joints 51e may be provided in the left and right sides of the fifth segment 50e, respectively. Each of a pair of sixth joints 51f may be provided in the left and right sides of the sixth segment 50f, respectively.

In this case, one side of the pair of second joints 51b may be rotatably connected to the pair of first joints 51a about an axis parallel to the left-right direction, and the other side of the pair of second joints 51b may be rotatably connected to the pair of third joints 51c about an axis parallel to the left-right direction. One side of the pair of third joints 51c may be rotatably connected to the second joints 51b about an axis parallel to the left-right direction, and the other side of the pair of third joints 51c may be rotatably connected to the pair of fourth joints 51d about an axis parallel to the left-right direction. One side of the pair of fourth joints 51d may be rotatably connected to the third joints 51c about an axis parallel to the left-right direction, and the other side of the pair of fourth joints 51d may be rotatably connected to the pair of fifth joints 51e about an axis parallel to the left-right direction. One side of the pair of fifth joints 51e may be rotatably connected to the fourth joints 51d about an axis parallel to the left-right direction, and the other side of the pair of fifth joints 51e may be rotatably connected to the pair of sixth joints 51f about an axis parallel to the left-right direction.

One side 511 of any one of the aforementioned joints 51 may be formed while being depressed inwardly from the other side 512. In this case, the other side 512 of any one of the aforementioned joints 51 may be rotatably coupled to the one side 511 of another joint. In addition, the other side 512 of any one of the aforementioned joints 51 may be disposed in parallel with the other side 512 of another joint so that they are adjacent to or in contact with each other.

The other side 512 of each of the aforementioned joints 51 may include a first part 512a having an edge formed in a straight line and a second part 512b having an edge formed in a curve. For example, the first part 512a may be formed in a rectangular shape as a whole, and the second part 512b may be formed in a semicircle shape. In this case, the second part 512b of the other side 512 of any one of the aforementioned joints 51 may contact the first part 512a of the other side 512 of another joint. Accordingly, any one of the aforementioned joints 51 may be rotatable with respect to another joint within a certain angular range.

Meanwhile, one end 50-1 of the trolley 50 may be fixed to the block 64, and the other end 50-2 may be fixed to a designated point of the rail 20 positioned in the upper side of the block 64. In this case, some of the plurality of segments described above of the trolley 50 may form an arc having a certain curvature, and the rest may form a straight line. In addition, when the roller 60 moves in the front-rear direction, one end 50-1 of the trolley 50 may move in the front-rear direction together with the roller 60 while the other end 50-2 of the trolley 50 is fixed to a designated point. In this case, according to the movement of one end 50-1 of the trolley 50, the position of the segments forming an arc among the plurality of segments described above may also be changed. For example, when one end 50-1 of the trolley 50 moves forward, the position of the segments forming an arc among the plurality of segments described above may be closer to the other end 50-2 of the trolley 50.

Meanwhile, a space 50S into which a cable C is inserted may be formed inside the trolley 50. The cable C inserted into the space 50S may be inserted into one end 50-1 of the trolley 50 and connected to the motor 30 through the other end 50-2. One end of the cable C may be electrically connected to a power source PS provided in the moving wall 10, and the other end may be electrically connected to the motor 30. That is, the power source PS may supply power to the motor 30 through the cable C. At this time, even if the moving wall 10 coupled to the roller 60 is moved according to the movement of the roller 60, the cable C is moved together with the trolley 50. Therefore, power supply to the motor 30 of the power source PS through the cable C can be continuously achieved without separately manipulating the disposition of the cable C.

Referring to FIGS. 5 and 7, the roller 60 may include a first roller 61 and a second roller 62. For example, each of the first roller 61 and the second roller 62 may include a plurality of rollers sequentially disposed in the front-rear direction.

The first roller 61 may be formed in a wheel shape as a whole. For example, a first groove 61a may be formed in an outer circumferential surface of the first roller 61. In this case, the body 21 may include a first guide rail 23a that protrudes from the lower inner surface of the body 21 toward the internal accommodation space 20S, and has a circular cross-section. In this case, the first groove 61a of the first roller 61 is in contact with the first guide rail 23a, and the first roller 61 rotates along the first guide rail 23a and may be moved in the front-rear direction.

The second roller 62 may be formed in a wheel shape as a whole. For example, the second groove 62a may be formed in an outer circumferential surface of the second roller 62. In this case, the body 21 may include a second guide rail 23b that protrudes from the lower inner surface of the body 21 toward the internal accommodation space 20S, has a circular cross-section. In this case, the second groove 62a of the second roller 62 is in contact with the second guide rail 23b, and the second roller 62 rotates along the second guide rail 23b and may be moved in the front-rear direction.

The block 64 may be positioned between the first roller 61 and the second roller 62, and coupled to the first roller 61 and the second roller 62 through a connecting rod 63. Here, the connecting rod 63 may extend long in the left-right direction, and penetrate the block 64 to be inserted into the first roller 61 and the second roller 62. Meanwhile, the aforementioned rod 80 may be fixed to the lower surface of the block 64. Meanwhile, one end 50-1 of the aforementioned trolley 50 may be fixed to the rear surface of the block 64.

In this case, a first bearing 611 may be disposed between the inner circumferential surface of the first roller 61 and the connecting rod 63. The first bearing 611 may support rotation of the first roller 61. For example, the inner ring of the first bearing 611 may be fixed to the connecting rod 63, the outer ring of the first bearing 611 may be fixed to the first roller 61, and a ball bearing may be disposed between the inner ring and the outer ring. In addition, a second bearing 621 may be disposed between the inner circumferential surface of the second roller 62 and the connecting rod 63. The second bearing 621 may support rotation of the second roller 62. For example, the inner ring of the second bearing 621 may be fixed to the connecting rod 63, the outer ring of the second bearing 621 may be fixed to the second roller 62, and a ball bearing may be disposed between the inner ring and the outer ring.

A carrier 65 may be fixed to the upper surface of the block 64. A carrier hole 65*a* may be formed inside the carrier 65. In this case, a wire W described later is inserted into the carrier hole 65*a* and fixed to the carrier 65, which will be described in more detail later.

Referring to FIGS. 5 and 8, a first position sensor PS1 and a second position sensor PS2 may be provided in the upper side of the rail 20. The first position sensor PS1 and the second position sensor PS2 may be spaced apart from each other in the front-rear direction. The first position sensor PS1 and the second position sensor PS2 may detect an object 66 positioned on the block 64. For example, the first position sensor PS1 and the second position sensor PS2 may be a HALL IC sensor. In this case, the object 66 may be a magnet. As another example, the first position sensor PS1 and the second position sensor PS2 may be an optical sensor. In this case, the object 66 may be a reflector.

Accordingly, the first position sensor PS1 and the second position sensor PS2 may detect the position of the block 64 in the front-rear direction, and calculate the position of the moving wall 10 coupled to the block 64.

Meanwhile, it is also possible for the display device 1 to include one or three or more position sensors.

Referring to FIGS. 5 and 9, the motor 30 may be fixed to the upper surface of the rail 20. For example, the motor 30 may be adjacent to the rear end of the rail 20.

The motor 30 may be driven by receiving power from the power source PS through a cable C. For example, the motor 30 may be a BLDC motor. When the motor 30 is driven, a rotation shaft 31 of the motor 30 may be rotated. The motor 30 may control the rotation direction and rotation speed of the rotation shaft 31.

A first pulley 41 may be disposed in the internal accommodation space 20S of the rail 20, and engaged with the rotation shaft 31 to rotate together with the rotation shaft 31. In this case, a first bearing 411 may rotatably support a rotation shaft 41*a* of the first pulley 41. In addition, a wire groove 41*b* with which a wire W described later is engaged may be formed in the outer circumferential surface of the first pulley 41. Meanwhile, a belt (Bet) may also be provided instead of the wire W.

A second pulley 42 may be disposed in the internal accommodation space 20S of the rail 20. In this case, a second bearing 421 may rotatably support the rotation shaft 42*a* of the second pulley 42. For example, the first pulley 41 may be adjacent to the rear end of the rail 20, and the second pulley 42 may be adjacent to the front end of the rail 20.

The wire W (shown as a dotted line in FIG. 5) forms a closed loop, and may be wound around the first pulley 41 and the second pulley 42. The wire W may be engaged with the wire groove 41*b* of the first pulley 41 and, when the first pulley 41 rotates, may move while being wound around the first pulley 41 and the second pulley 42. At this time, since the diameter of the first pulley 41 and the diameter of the second pulley 42 are larger than the width of the trolley 50 described above, the movement of the wire W may not be limited by the trolley 50.

In addition, the wire groove 41*b* of the first pulley 41 and the second pulley 42 may be disposed side by side in the front-rear direction. In addition, the carrier 65 may be positioned between the first pulley 41 and the second pulley 42, and the wire W may penetrate the carrier hole 65*a*. In this case, a portion of the wire W inserted into the carrier hole 65*a* may be fixed to the carrier 65. In other words, the carrier 65 may form a closed loop and be fixed to a portion of a straight section of the wire W wound around the first pulley 41 and the second pulley 42.

Accordingly, when the motor 30 is driven, the wire W and the carrier 65 coupled thereto may move in the front-rear direction.

Referring to FIGS. 10 and 11, the block 64 which is coupled to the carrier 65 and has a movement that is guided by the roller 60 in the front-rear direction can move in the front-rear direction, and the moving wall 10 coupled to the block 64 through the rod 80 may also move in the front-rear direction.

For example, the moving wall 10 may move forward or rearward by a certain distance Ds.

Accordingly, the position at which the image is output from the display unit 11 provided in the moving wall 10 can also be moved forward or rearward, so that the position of the moving wall 10 corresponding to the user's position can be manipulated.

Referring to FIGS. 12 to 15, the moving wall 10 can move in various directions with respect to the aforementioned rail 20.

Referring to FIG. 12, a portion of the rod 80 may be embedded in the second outer frame 122 of the moving wall 10, so that the position of the rod 80 with respect to the moving wall 10 may be fixed. In addition, the pair of rails 20*a* and 20*b* may be spaced apart from each other in the left-right direction, and each rail may extend long in the front-rear direction.

Accordingly, the moving wall 10 may move in the front-rear direction along the pair of rails 20*a* and 20*b*.

Referring to FIG. 13, a portion of the rod 80 may be inserted into a second outer frame 122' of the moving wall 10. In this case, a first stopper 122*a* may be provided in the left side of the rod 80, and a second stopper 122*b* may be provided in the right side of the rod 80. In this case, the first stopper 122*a* and the second stopper 122*b* may be provided to be movable in the up-down direction. That is, the first stopper 122*a* and the second stopper 122*b* may be in contact with the rod 80 at the left or right side of the rod 80 and may limit the movement of the rod 80 in the left-right direction, or the rod 80 may be separated from the rod 80 at the left or right side of the rod 80 and may not limit the movement in the left-right direction.

In addition, the display device 1 may include a tilting motor 30' (not shown) that provides rotational force to the moving wall 10. In this case, the rotation shaft of the tilting motor 30' may be coupled to the center of the upper or lower surface of the moving wall 10. That is, when the tilting motor 30' is driven, the moving wall 10 may be rotated based on a first center O1 (see Rt1).

For example, when the moving wall 10 rotates counterclockwise according to the driving of the tilting motor 30', the rod 80 coupled to the first rail 20*a* positioned in the left of the pair of rails 20*a* and 20*b* moves rearward along the first rail 20*a*, and the rod 80 coupled to the second rail 20*b* positioned in the right of the pair of rails 20*a* and 20*b* may move forward along the second rail 20*b*.

In this case, a first arc ARC1 having a first radius R1 based on the first center O1 may contact the first rail 20*a* or the second rail 20*b* at one point. Here, the first radius R1 may be a vertical distance from the first center O1 to the rod 80. In other words, it is necessary that the rod 80 coupled to the first rail 20*a* moves to the left within the second outer frame 122' (see ML). To this end, the first stopper 122*a* may be moved downward within the second outer frame 122'. In addition, it is necessary that the rod 80 coupled to the second rail 20*b* moves to the right within the second outer frame 122' (see MR). To this end, the second stopper 122*b* may be moved downward within the second outer frame 122'.

Accordingly, the moving wall 10 can not only move in the front-rear direction along the pair of rails 20*a* and 20*b*, but also rotate with the first center O1, so that the position or posture of the moving wall 10 can be more variously adjusted.

Referring to FIG. 14, a portion of the rod 80' may be inserted into the second outer frame 122' of the moving wall 10. In this case, the first stopper 122*a* may be provided in the left side of the rod 80', and the second stopper 122*b* may be provided in the right side of the rod 80'. In this case, the first stopper 122*a* and the second stopper 122*b* may be provided to be movable in the up-down direction. That is, the first stopper 122*a* and the second stopper 122*b* may contact the rod 80' at the left or right side of the rod 80' to limit the left-right movement of the rod 80', or may be separated from the rod 80' at the left or right side of the rod 80' not to limit the left-right movement of the rod 80'.

In addition, the display device 1 may include a tilting motor 30" (not shown) that provides a rotational force to the rod 80'. In this case, the rotation shaft of the tilting motor 30" may be coupled to the central shaft of the rod 80'. That is, when the tilting motor 30" is driven, the moving wall 10 may be rotated based on a second center O2 (see Rt2).

For example, when the moving wall 10 rotates clockwise according to the driving of the tilting motor 30", the position of the rod 80' coupled to the first rail 20*a* may be fixed, and the rod 80' coupled to the second rail 20*b* may move rearward along the second rail 20*b*.

In this case, a second arc ARC1 having a second radius R2 based on the second center O2 may contact the second rail 20*b* at one point. Here, the second radius R2 may be a vertical distance from the second center O2 to the rod 80'. In other words, it is necessary that the rod 80' coupled to the first rail 20*a* is rotatably provided within the second outer frame 122'. In addition, it is necessary that the rod 80' coupled to the second rail 20*b* moves to the right within the second outer frame 122' (see MR). To this end, the second stopper 122*b* may be moved downward within the second outer frame 122'.

Accordingly, the moving wall 10 can not only move in the front-rear direction along the pair of rails 20*a* and 20*b*, but also can be rotated with the second center O2, so that the position or posture of the moving wall 10 can be more variously adjusted.

Referring to FIG. 15, the display device 1 may include a tilting motor 30" (not shown) that provides a rotational force to the rod 80'. In this case, the rotation shaft of the tilting motor 30" may be coupled to the central shaft of the rod 80'. That is, when the tilting motor 30" is driven, the moving wall 10 may be rotated based on a third center O3 (see Rt3).

In addition, the display device 1 may include a third rail 20' disposed between the first rail 20*a* and the second rail 20*b*. The third rail 20' may extend along a third arc ARC3 having a third radius R3 based on the third center O3. Here, the third radius R3 may be a vertical distance from the third center O3 of the rod 80' coupled to the first rail 20*a* to the rod 80' coupled to the second rail 20*b*. One end of the third rail 20' may be connected to the second rail 20*b*, and the other end may be connected to the first rail 20*a*. Meanwhile, the third rail 20' may be referred to as a curved rail.

At this time, a baffle 201 may be rotatably provided in the second rail 20*b*, and may partition a space extending from a portion of the second rail 20*b* to the rest, or partition a space extending from a portion of the second rail 20*b* to the third rail 20'.

For example, when the moving wall 10 rotates clockwise according to the driving of the tilting motor 30", the position of the rod 80' coupled to the first rail 20*a* may be fixed, and the rod 80' coupled to the second rail 20*b* may be moved along the third rail 20' and guided to the first rail 20*a*. To this end, the baffle 201 may be disposed to partition a space extending from a portion of the second rail 20*b* to the third rail 20'.

Accordingly, the moving wall 10 can not only move in the front-rear direction along the pair of rails 20*a* and 20*b*, but also rotate with the third center O2, and may move in the front-rear direction along the first rail 20*a* while facing the second rail 20*b*. As a result, the position or posture of the moving wall 10 can be more variously adjusted.

Referring to FIGS. 16 and 17, an end cover 90 may form a lower end and an upper end of the moving wall 10. The end cover 90 may include a first end cover 91 forming a lower end of the moving wall 10 and a second end cover 92 forming an upper end of the moving wall 10. In this case, the first end cover 91 may be movably coupled to the first outer frame 121 in the up-down direction. In addition, the second end cover 92 may be movably coupled to the second outer frame 122 in the up-down direction.

The first end cover 91 may be lifted up by a certain distance H1 upward from the floor FL, or may be lifted down to the floor FL by a certain distance H1 so as to be adjacent to or in contact with the floor FL, in the lifted-up state.

The second end cover 92 may be lifted up by a certain distance H2 downward from the ceiling CE, or may be lifted down by a certain distance H2 to the ceiling CE so as to be adjacent to or in contact with the ceiling CE, in the lifted-up state.

For example, the first end cover 91 may be moved in the up-down direction by a lifting assembly described later. The lifting assembly may include a lifting motor 901, a lead screw 902, a pusher 903, a first plate 904, a second plate 905, a first link L1, and a second link L2.

The lifting motor 901 may be driven by receiving power from the power source PS through the cable Ca. When the lifting motor 901 is driven, the rotation shaft 901*a* of the lifting motor 901 may be rotated. In this case, the rotation shaft 901*a* may be rotated in a first direction or may be rotated in a second direction opposite to the first direction.

The lead screw 902 may be fixed to the rotation shaft 901*a*, and rotate together with the rotation shaft 901*a*. The lead screw 902 may be formed in a cylindrical shape as a whole. In addition, a male thread may be formed on the outer circumferential surface of the lead screw 902.

The pusher 903 may be coupled to the lead screw 902. A portion of the lead screw 902 may be inserted into the pusher 903. In this case, a female thread that engages with a male thread formed on an outer circumferential surface of the lead screw 902 may be formed on the inner circumferential surface of the pusher 903. In addition, the pusher 903 may be provided so as not to rotate in the rotational direction of the rotation shaft 901*a*. Accordingly, when the lead screw 902 rotates in the first direction, the pusher 903 may move linearly in the right direction, and when the lead screw 902 rotates in the second direction opposite to the first direction, the pusher 903 may move linearly in the left direction. Meanwhile, the pusher 903 may be referred to as a slide or a rod.

The first plate 904 may include a first slot 9041 elongated in the left-right direction. The first plate 904 may include a pair of protrusions 9042 and 9043 that protrude rearward from the first plate 904 and are spaced apart from each other in the left-right direction.

The second plate 905 may be positioned in a rear direction of the first plate 904. The second plate 905 may include a second slot 9051 that is positioned in a lower side of the first slot 9041, and elongated in the left-right direction. The second plate 905 may include a pair of slots 9052 and 9053 that are formed to be elongated in the up-down direction and spaced apart from each other in the left-right direction.

One end of the first link L1 may be inserted into the first slot 9041 and fixed to the distal end of the pusher 903. One end of the second link L2 may be fixed to the first plate 904. In this case, the position of one end of the second link L2 may be fixed, and the position of one end of the first link L1 may move in the left-right direction along the first slot 9041, in correspondence with the linear motion of the pusher 903. In this case, the positions of one end of the first link L1 and one end of the second link L2 in the up-down direction may be continuously the same.

The other end of the first link L1 may be rotatably coupled to the other end of the second link L2, and inserted into the second slot 9042. In this case, the positions of the other end of the first link L1 and the other end of the second link L2 may be moved in the left-right direction along the second slot 9051, in correspondence with the linear motion of the pusher 903. In addition, each of the pair of protrusions 9042 and 9043 may be inserted into each of the pair of slots 9052 and 9053, and be movable in the up-down direction.

In this case, the first link L1 and the second link L2 may be rotated about a virtual axis penetrating the center of the other end of the first link L1 and the other end of the second link L2 to be unfolded or folded.

Referring to the upper drawing of FIG. 17, for example, when the pusher 903 moves in the left direction, each of one end and the other end of the first link L1 moves to the left from each of the first slot 9041 and the second slot 9051, so that a gap between the first link L1 and the second link L2 may be widened. In this case, the position of the first plate 904 in the up-down direction may be fixed, and the second plate 905 may move upward.

In this case, the first end cover 91 may be coupled to the second plate 905, moved upward together with the second plate 905, and lifted up by a certain distance H1 from the floor FL.

Referring to the lower drawing of FIG. 17, for example, when the pusher 903 moves in the right direction, each of one end and the other end of the first link L1 may move to the right from each of the first slot 9041 and the second slot 9051, so that a gap between the first link L1 and the second link L2 may be narrowed. In this case, the position of the first plate 904 in the up-down direction may be fixed, but the second plate 905 may move downward.

In this case, the first end cover 91 may be coupled to the second plate 905, moved downward together with the second plate 905, and lifted down by a certain distance H1 to the floor FL.

Meanwhile, the second end cover 92 may also be moved in the up-down direction by the aforementioned lifting assembly.

Accordingly, if it is necessary to move the moving wall 10, the end cover 90 may be lifted up to prevent movement of the moving wall 10 from being limited by the floor FL or the ceiling CE. In addition, if it is not necessary to move the moving wall 10, the end cover 90 may be lifted down to cover the upper and lower ends of the moving wall 10, while the sense of unity of the floor FL or ceiling CE and the moving wall 10 can be improved.

Referring to FIG. 18, the display device 1 may include a controller 9 that controls the aforementioned components. In addition, the controller 9 may be electrically connected to a display panel 11a, an audio unit A, a camera V, a sliding motor 30, a tilting motor 30', 30", a lifting motor 901, a user interface unit I, a communication unit CM, a memory Me, and a power source PS.

The aforementioned display panel 11a may output an image based on an image signal received from the controller 9. The sliding motor 30, the tilting motors 30', 30", and the lifting motor 901 described above are electrically connected to the controller 9, so that the rotational direction and rotational speed of each rotational shaft can be controlled.

The audio unit A may include an audio device such as a speaker and a buzzer. The audio unit A may output a sound based on a voice signal received from the controller 9. For example, the audio unit A may include the first audio unit A1 and the second audio unit A2 described above.

The camera V may be provided in the front surface of the moving wall 10 to photograph a front image of the moving wall 10. For example, the camera V may detect a position of a user or an object positioned in front of the moving wall 10. For example, the camera V may calculate a distance between a user or an object positioned in front of the moving wall 10 and the moving wall 10. For example, the camera V may be a stereo type camera.

The user interface unit I may transmit a user input or command related to an operation of the display device to the controller 9. The user interface unit I may include an input unit Ia and an output unit Ib.

For example, the input unit Ia may be electrically connected to a display panel 11a having a touch panel or a component of a display device such as the microphone M. For example, the input unit Ia may be electrically connected to an external device such as a remote control device or a mobile terminal such as a smart phone in a wired or wireless manner. In this case, the controller 9 may control each component of the display device based on a signal or information input through the input unit Ia. That is, a user may control the operation of the display device by touching the display panel 11a, inputting a voice into the microphone M, or operating an external device.

For example, the output unit Ib may be electrically connected to a component of a display device such as the display panel 11a or the audio unit A. For example, the output unit Ib may be electrically connected to an external device such as a remote control device or a mobile terminal such as a smart phone in a wired or wireless manner. In this case, the controller 9 may output information related to the state or operation of the display device to the outside through the output unit Ib. That is, a user may check information related to the state or operation of the display device based on a screen displayed on the display panel 11a, a sound output to the audio unit A, or information received from an external device.

The communication unit CM may transmit information of the display device to an external device, or may transmit various information or signals from the external device to the display device. The communication unit CM may communicate with a remote control device, a mobile terminal, a wired/wireless router, or other communication infrastructure (e.g., a server). For example, the communication unit CM may perform wireless communication with an external device by using a communication technology such as IEEE 802.11 WLAN, IEEE 802.15 WPAN, UWB, Wi-Fi, Zigbee, Z-wave, and Blue-Tooth.

The memory Me may be electrically connected to the controller 9. The memory Me may store basic data for the display device (e.g., basic specification information for each component of the display device, such as display resolution, brightness, sound output value, and moving wall position), data and programs for controlling the operation of the display device, data input or output through the user interface unit I, or data processed by the controller 9, and the like. For example, the memory Me may store a path along which the moving wall 10 moves to a current position, and may provide corresponding data to the controller 9. For example, the memory Me may include ROM, RAM, EPROM, a flash drive, a hard drive, or the like. For example, the memory Me may be classified as a sub-configuration of the controller 9.

The power source PS may provide power to each component of the display device 1. For example, the power source PS may receive power from an external power source (EPS) to provide power to each component of the display device 1. As another example, the power source PS may be provided as a rechargeable battery.

The controller 9 may be electrically connected to each component of the display device 1. Here, the controller 9 may be referred to as a processor. The controller 9 may detect the state of the display device based on information or signals transmitted from each component of the display device. In addition, the controller 9 may process the received data or generate a control signal based on data or a program stored in the memory Me to control the operation of each component of the display device.

That is, the controller 9 may detect the state of each component of the display device such as the display panel 11*a*, the audio unit A, or the motor 30, 30', 30", 901, and provide a control signal to these components, thereby controlling the operation of these components.

For example, the controller 9 may transmit a control signal, an image signal, and the like to a timing controller board (T-CON board) (not shown) of the display unit 11. In this case, the display panel 11*a* may display a screen according to digital video data and a timing control signal transmitted from the T-CON board. To this end, the display panel 11*a* may be electrically connected to the T-CON board through a flexible flat cable (FFC) (not shown).

For example, the controller 9 may control the operation of the sliding motor 30 so that the moving wall 10 moves in the front-rear direction along the rail 20 by a calculated moving distance. For example, the controller 9 may control the operation of the tilting motor 30', 30" so that the moving wall 10 is rotated by a calculated angle. For example, the controller 9 may control the operation of the lifting motor 901 so that the end cover 90 is lifted up or lifted down.

Referring to FIG. 19, when the display device 1 enters an automatic tracking mode (S1), the controller 9 can obtain position information of a user positioned in front of the moving wall 10 from the camera V (S2). Here, the automatic tracking mode may be a mode for adjusting and optimizing a distance from a user to the display panel 11*a* provided in the moving wall 10, based on information stored in the memory Me or information set arbitrarily by a user. For example, the automatic tracking mode may be entered based on a user's input.

At S2, the controller 9 may calculate the distance from a user to the display panel 11*a* provided in the moving wall 10. For example, at S2, the controller 9 may calculate the distance from a user holding the remote control device to the display panel 11*a*, based on the sound pressure of sound source transmitted to the display device 1 by the remote control device. To this end, the controller may use a sound source localization (SSL) technology. As another example, at S2, the controller 9 may calculate the distance from a user to the display panel 11*a*, based on the camera V or a device that transmits an RF signal or a laser signal.

After S2, the controller 9 may calculate a position of the moving wall 10 that can optimize the distance from a user to the moving wall 10 (S3). Here, the moving wall 10 may be moved in the front-rear direction along the rail 20 described above, or rotated based on the first center O1, the second center O2, or the third center O3, thereby adjusting the position of the moving wall 10.

After S3, the controller 9 may determine whether a difference between the current position of the moving wall 10 and the optimal position of the moving wall 10 calculated at S3 exceeds a reference value (S4). In other words, when the current position of the moving wall 10 is positioned within a certain error range of the calculated optimal position, it may be determined that the difference between the current position of the moving wall 10 and the calculated optimal position is less than or equal to the reference value.

If it is determined that the difference between the current position of the moving wall 10 at S4 and the optimal position of the moving wall 10 calculated at S3 is equal to or less than the reference value (No at S4), the controller 9 may return to S2. If it is determined that the difference between the current position of the moving wall 10 at S4 and the optimal position of the moving wall 10 calculated at S3 exceeds the reference value (Yes at S4), the controller 9 may output a message indicating that the position of the moving wall 10 will be automatically moved, i.e., an automatic tracking schedule message, to a user, as a display image, sound, or terminal message (S5).

After S5, the controller 9 may determine whether a signal for approving the position movement of the moving wall 10 is received from the user within a certain time (S6). When the signal is not received at S6 (Yes at S6), the controller 9 may determine whether an automatic tracking mode termination signal is received (S7). If the termination signal is not received at S7, the controller 9 may return to S2. When the signal is received at S6 (No at S6), the controller 9 may drive the lifting motor 901 to lift up the end cover 90, thereby preparing the position movement of moving wall 10 (S8).

After S8, the controller 9 may drive the sliding motor 30 and/or the tilting motors 30', 30" to move the moving wall 10 to the optimal position calculated at S3 (S9).

After S9, the controller 9 may drive the lifting motor 901 to lift down the end cover 90, thereby terminating the position movement of the moving wall 10 (S10). In addition, after S10, the controller 9 may output a message informing a user that the position movement of the moving wall 10 is completed, i.e., an automatic tracking completion message, as a display image, sound, or terminal message (S11).

Accordingly, the position from which the display panel 11*a* outputs an image is automatically changed according to the user's position, thereby increasing the user's viewing convenience.

Referring to FIG. 20, when a user voice command for requesting content play is input to the display device 1 (S20), the controller 9 may search the content requested by a user (S21). For example, the content may be an image such as a movie or a drama output through the display panel 11*a*, or a sound such as music output through the audio unit A.

For example, the user voice command may be input to the controller 9 through the microphone M.

At S21, the controller 9 may access an external server or an Internet environment through the communication unit CM to search content requested by a user. After S21, the controller 9 may output a message indicating that it is possible to enter a mode that can optimize the distance from a user to the moving wall 10, i.e., an optimal viewing mode message, as a display image, sound, or terminal message to the user, according to the type of content searched at S21 (S22).

After S22, it may be determined whether an entry signal of the optimal viewing mode is received from the user (S23). When the signal is not received at S23 (No at S23), the controller 9 may play the content searched at S21 (S33). When the signal is received at S23 (Yes at S23), the controller 9 may obtain position information of a user positioned in front of the moving wall 10 from the camera V (S24).

At S24, the controller 9 may calculate the distance from a user to the display panel 11*a* provided in the moving wall 10. After S24, the controller 9 may calculate a position of the moving wall 10 that can optimize the distance from a user to the moving wall 10 (S25). Here, the moving wall 10 may be moved in the front-rear direction along the rail 20 described above, or rotated based on the first center O1, the second center O2, or the third center O3, thereby adjusting the position of the moving wall 10.

After S25, the controller 9 may determine whether a difference between the current position of the moving wall 10 and the optimal position of the moving wall 10 calculated at S25 exceeds a reference value (S26). In other words, when the current position of the moving wall 10 is positioned within a certain error range of the calculated optimal position, it may be determined that the difference between the current position of the moving wall 10 and the calculated optimal position is less than or equal to the reference value.

If it is determined that the difference between the current position of the moving wall 10 at S26 and the optimal position of the moving wall 10 calculated at S25 is equal to or less than the reference value (No at S26), the controller 9 may inform a user that the current position is the optimal position (S32), and may play the content searched at S21 (S33). If it is determined that the difference between the current position of the moving wall 10 at S26 and the optimal position of the moving wall 10 calculated at S25 exceeds the reference value (Yes at S26), the controller 9 may output a message indicating that the position of the moving wall 10 will be automatically moved, i.e., an automatic moving schedule message, to a user, as a display image, sound, or terminal message (S27).

After S27, the controller 9 may drive the lifting motor 901 to lift up the end cover 90, thereby preparing the positional movement of moving wall 10 (S28).

After S8, the controller 9 may drive the sliding motor 30 and/or the tilting motors 30', 30" to move the moving wall 10 to the optimal position calculated at S25 (S29).

After S29, the controller 9 may drive the lifting motor 901 to lift down the end cover 90, thereby terminating the position movement of the moving wall 10 (S30). In addition, after S30, the controller 9 may output a message informing a user that the position movement of the moving wall 10 is completed, i.e., an automatic moving completion message, as a display image, sound, or terminal message (S31). After S31, the controller 9 may play the content searched at S21 (S33).

Accordingly, the position from which the display panel 11*a* outputs an image is automatically changed according to the type of playing content, thereby increasing the user's viewing convenience.

Referring to FIGS. 1 and 21, the lower part 2 may be provided in the lower side of the display unit 11 to cover at least a portion of the lower portion of the moving wall 10. The upper part 3 may be provided in the upper side of the display unit 11 to cover at least a portion of the upper portion of the moving wall 10. The veil 5 may be provided in front of the display unit 11, and move in the up-down direction to expose the front of the display unit 11 to the outside, or to cover at least a portion of the front of the display unit 11. Meanwhile, the veil 5 may be referred to as a cover or a front cover.

For example, the lower part 2 may have a rear surface fixed to the front surface of the first outer frame 121 (see FIG. 4), and the upper part 3 have a rear surface fixed to the front surface of the second outer frame 122 (see FIG. 4). For example, the veil 5 may be movably coupled to the third outer frame 123 and the fourth outer frame 124 in the up-down direction. In this case, the display device may have an electric motor that supplies power to the veil 5.

Accordingly, the display device may have a first display state in which the veil 5 covers the entire front of the display unit 11, a second display state in which the veil 5 is moved to the upper side than the first display state to expose a portion of the front of the display unit 11, a third display state in which the veil 5 is moved to the upper side than the second display state to further expose a portion of the front of the display unit 11, and a fourth display state in which the veil 5 is moved to the upper side than the third display state to expose the entire front of the display unit 11.

Meanwhile, the first display state may be called a wall mode, the second display state may be called a line view mode, the third display state may be called a half view mode, and the fourth display state may be called a full view mode.

Referring to FIGS. 21 and 22, when a user voice command for requesting content play is input to the display device 1 (S40), the controller 9 may search the content requested by the user (S41). For example, the content may be an image such as a movie or a drama output through the display panel 11*a*. For example, the user voice command may be input to the controller 9 through the microphone M.

At S41, the controller 9 may access an external server or an Internet environment through the communication unit CM to search the content requested by a user. After S41, the controller 9 may load optimal veil mode information suitable for viewing the content, according to the type of content searched at S41 (S42). Here, the veil mode may be a mode for setting the degree of exposing the display unit 11 by the veil 5, such as the aforementioned line view mode, half view mode, and the full view mode.

After S42, the controller 9 may determine whether the current veil mode does not match the optimal veil mode loaded at S42 (S43). If it is determined at S43 that the current veil mode and the loaded optimal veil mode match (No at S43), the controller 9 may output a sound through the audio unit A while playing the image content through the display panel 11*a* (S46). If it is determined at S43 that the current veil mode and the loaded optimal veil mode do not match (Yes at S43), the controller 9 moves the veil 5 in the up-down direction to convert the current veil mode to the optimal veil mode. (S44). Then, the controller 9 may select a speaker to output sound in the converted veil mode (S45), and play the image content through the display panel 11*a* while outputting the sound to the selected speaker (S46).

In this regard, the first audio A1 and the second audio A2 are provided in the left and right sides of the display unit 11, so that the front of the first audio A1 and the second audio A2 may also be covered by the veil 5 in correspondence with the degree of covering the front of the display unit 11 by the veil 5. That is, it may be necessary to select a position of a speaker to output sound from each of the first audio A1 and the second audio A2 in correspondence with the degree of exposing the display unit 11 by the veil 5.

After S46, when a user voice command requesting a specific operation is input to the display device 1 (S47), the controller 9 may separate the user's voice from the sound output from the speaker (S48). For example, the user's voice input at S47 may be an utterance of a wakeup word. To this end, the sound output from the speaker may be received again, and converted into digital sound data through an analog to digital converter ADC. In addition, user voice data and digital sound data may be integrated in an integrated interchip sound (I2S), and digital sound data may be separated from user voice data through an acoustic echo cancelling (AEC).

After S48, the controller 9 may determine whether the user's voice is recognized (S49). If it is determined at S49 that the user's voice is not recognized due to a reason that user voice data and digital sound data are incompletely separated (No at S49), the controller 9 may return to S47. When it is determined at S49 that the user's voice is recognized (Yes at S49), the controller 9 may inform a user that the voice recognition is completed (S50). Then, after S50, the controller 9 may lower the volume of the sound output from the speaker to wait for the reception of the user voice command for a certain time (S51).

Accordingly, the size of the image output from the display panel 11a is automatically changed according to the type of playing content, so that the user's viewing convenience can be increased. In addition, even when sound is being output, a user may command a specific operation to the display device by uttering a wakeup word, or the like.

Referring to FIGS. 21 and 23, the display device 1 may enter an automatic resolution change mode according to the veil mode (S60). Here, the automatic resolution change mode may be a mode to optimize the resolution or size of the display image according to the degree to which the display panel 11a is exposed forward by the veil 5, based on information stored in the memory Me or information arbitrarily set by the user. For example, the automatic resolution change mode may be entered based on a user input. Meanwhile, in order to change the resolution of the display image, the display device may include a resolution converter RC.

After S60, the controller 9 may determine whether a static change type is selected (S61). At S61, a user may select a static change type or a dynamic change type. Here, the static change type may be a mode in which after a conversion of veil mode is completed, the resolution or size is changed according to the converted veil mode. In addition, the dynamic change type may be a mode in which the resolution or size is changed at a certain speed while the veil mode is being converted.

When the static change type is selected (Yes at S61), the controller 9 may receive a signal instructing a conversion of the veil mode (S62). After S62, the controller 9 may convert the veil mode (S63), and calculate an optimal resolution or size in the converted veil mode (S64). After S64, the controller 9 may output an image having the resolution or size calculated at S64 through the display panel 11a (S65).

When the dynamic change type is selected (No at S61), the controller 9 may receive a signal instructing a conversion of the veil mode (S66). After S66, the controller 9 may calculate the conversion speed of the veil mode (S67). Here, the conversion speed of the veil mode may be a value obtained by dividing the moving distance of the veil 5 for conversion of the veil mode by the time taken for the conversion of the veil mode. After S67, the controller 9 may calculate a change in resolution or size before and after the conversion of veil mode, based on the resolution or size information before and after the conversion of veil mode, respectively (S68). After S68, the controller 9 may output an image having a resolution or size that is changed according to the conversion speed of the veil mode through the display panel 11a (S69).

According to an aspect of the present disclosure, provided is a display device including a rail which extends long; a moving wall which extends long in a direction intersecting the rail and has a display panel; and a rod which is positioned between the rail and the moving wall; wherein one end of the rod is coupled to the rail to be movable in a length direction of the rail, and the other end of the rod is fixed to the moving wall, wherein the moving wall is movable in the length direction of the rail.

According to another aspect of the present disclosure, the rail further includes: a body which provides an internal accommodation space formed to extend long in the length direction of the rail, and has an opening through which the rod passes; and a block which is disposed in the internal accommodation space, and movable in the length direction of the rail, wherein one end of the rod is fixed to the block.

According to another aspect of the present disclosure, the rail further includes: a pair of guide rails which protrude from an inner surface of the body toward the inner accommodating space, extend long in the length direction of the rail, and are paced apart from each other with the opening therebetween; a pair of rollers which are positioned in one side and the other side of the block in a direction intersecting the length direction of the rail; and a connecting rod which passes through the block, and is coupled to the pair of rollers, wherein each of the pair of rollers has an outer surface in which a groove in contact with each of the pair of guide rails is formed.

According to another aspect of the present disclosure, the display device further includes: a sliding motor which provides power to the block; a first pulley which is disposed in the internal accommodation space, and engaged with a rotation shaft of the sliding motor; a second pulley which is disposed in the internal accommodation space, and spaced apart from the first pulley in the length direction of the rail; and a wire which forms a closed loop, and is caught on the first pulley and the second pulley, wherein the rail further includes a carrier which is fixed to the block, and has a carrier hole into which a part of the wire is inserted, wherein the carrier is fixed to the rail.

According to another aspect of the present disclosure, the display device further includes: a sliding motor which provides power to the block; a trolley which has one end fixed to the block and the other end fixed to an inner surface of the body, wherein the trolley has a plurality of segments sequentially arranged; and a cable which is inserted into an inner space of the trolley, and transmits power to the sliding motor, wherein one end of the trolley is positioned in a lower side of the other end of the trolley, and the plurality of segments are rotatably coupled to each other in a direction intersecting the length direction of the rail.

According to another aspect of the present disclosure, the plurality of segments include: a first segment which forms one end of the trolley, wherein the first segment has a pair of first joints formed in one side and the other side of the first segment respectively; and a second segment connected to the first segment; wherein the second segment has a pair of second joints formed in one side and the other side of the second segment respectively, wherein the pair of first joints are rotatably connected to the pair of second joints.

According to another aspect of the present disclosure, the first segment further includes a second part having an edge formed in a curve, wherein the second segment further includes a first part having an edge formed in a straight line, wherein the first part is in contact with the second part.

According to another aspect of the present disclosure, the rails further includes a pair of ribs which protrudes from the inner surface of the body toward the internal accommodation space, and are spaced apart from each other with the trolley interposed therebetween.

According to another aspect of the present disclosure, the rail further includes a pair of rails which extend long in a front-rear direction, and are spaced apart from each other in a left-right direction, wherein the rod further includes a pair of rods coupled to each of the pair of rails.

According to another aspect of the present disclosure, the display device further includes a tilting motor which provides a rotational force to the pair of rods or the moving wall, wherein the moving wall further includes a pair of stoppers into which each of the pair of rods is inserted, and which are disposed in a left or right side of each of the pair of rods, wherein the pair of stoppers are able to move in an up-down direction in the moving wall, and the moving wall is rotatable about a rotation shaft of the tilting motor.

According to another aspect of the present disclosure, the rail further includes a curved rail which is disposed between the pair of rails, and extends along an arc having a vertical distance between the pair of rods as a radius of curvature, wherein the curved rail has one end coupled to one of the pair of rails and has the other end coupled to the other of the pair of rails.

According to another aspect of the present disclosure, the moving wall further includes: an outer frame which forms a circumference of the moving wall, wherein the outer frame has a first outer frame forming a lower end of the outer frame and a second outer frame forming an upper end of the outer frame; a first end cover which is coupled to the first outer frame, and forms a lower end of the moving wall; a second end cover which is coupled to the second outer frame, and forms an upper end of the moving wall; a first lifting assembly which is provided in the moving wall, and moves the first end cover in an up-down direction; and a second lifting assembly which is provided in the moving wall, and moves the second end cover in the up-down direction.

According to another aspect of the present disclosure, the first lifting assembly includes: a lifting motor which has a rotation shaft; a lead screw which is engaged with the rotation shaft of the lifting motor, and has a male thread formed on an outer circumferential surface; a pusher which has a female thread, which is engaged with the male thread of the lead screw, that is formed on an inner circumferential surface, and is able to linearly move in a left-right direction; a first link which has one end fixed to the pusher; a first plate into which one end of the first link is inserted, and has a first slot which extends long in the left-right direction; a second plate which faces the first plate, is fixed to the first end cover, and has a second slot which extends long in the left-right direction; and a second link which has one end fixed to the first plate, has the other end coupled to the other end of the first link, and is inserted into the second slot.

According to another aspect of the present disclosure, the display device further includes: a sliding motor which provides power to the moving wall; a camera which is provided in a front surface of the moving wall, and detects a position of an object positioned in front of the moving wall; and a controller which controls a rotation direction and a rotation speed of the motor, wherein, in an automatic tracking mode, the controller calculates an optimal distance between the object and the display panel based on information obtained from the camera, and controls an operation of the motor to move the moving wall along the rail.

According to another aspect of the present disclosure, the display device further includes: a veil which is provided in a front surface of the moving wall, and covers at least a portion of a front of the display panel, wherein the veil is movable in an up-down direction; and a motor which provides power to the veil; and a controller which controls a rotation direction and a rotation speed of the motor, wherein the controller adjusts a resolution or size of an image output from the display panel, according to a position of the veil in the up-down direction.

Certain embodiments or other embodiments of the disclosure described above are not mutually exclusive or distinct from each other. Any or all elements of the embodiments of the disclosure described above may be combined or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A display device comprising:
a rail which is elongated;
a moving wall which extends in a direction intersecting the rail and includes a display panel; and
a rod which is positioned between the rail and the moving wall, the rod having a first end movably coupled to the rail in a length direction of the rail, and a second end fixed to the moving wall,
a sliding motor configured to provide power to the moving wall;
a camera provided on a front surface of the moving wall and configured to detect a position of an object positioned in front of the moving wall; and
a controller configured to control a rotation direction and a rotation speed of the sliding motor,
wherein the moving wall is movable in the length direction of the rail, and
wherein, in an automatic tracking mode, the controller calculates an optimal distance between the object and the display panel based on information obtained from the camera, and controls an operation of the sliding motor to move the moving wall along the rail.

2. The display device of claim 1, wherein the rail comprises:
a body defining an internal accommodation space extending in the length direction of the rail the body having an opening through which the rod passes; and
a block disposed in the internal accommodation space, and movable in the length direction of the rail, and
wherein the first end of the rod is fixed to the block.

3. The display device of claim 2, wherein the rail further comprises:
a pair of guide rails which protrude from an inner surface of the body toward the inner accommodating space, extend in the length direction of the rail, and are spaced apart from each other with the opening therebetween;
a pair of rollers which are positioned in a first side and a second side of the block in a direction intersecting the length direction of the rail; and
a connecting rod which passes through the block, and is coupled to the pair of rollers, and
wherein each of the pair of rollers has an outer surface in which a groove in contact with each of the pair of guide rails is formed.

4. The display device of claim 2, further comprising:
a first pulley which is disposed in the internal accommodation space, and engaged with a rotation shaft of the sliding motor;
a second pulley which is disposed in the internal accommodation space, and spaced apart from the first pulley in the length direction of the rail; and
a wire which forms a closed loop, and is caught on the first pulley and the second pulley,
wherein the sliding motor is configured to provide power to the block,
wherein the rail further comprises a carrier which is fixed to the block, and has a carrier hole into which a part of the wire is inserted, and
wherein the carrier is fixed to the rail.

5. The display device of claim 2, further comprising:
a trolley which has a first end fixed to the block and a second end fixed to an inner surface of the body, wherein the trolley has a plurality of segments sequentially arranged; and
a cable which is inserted into an inner space of the trolley, and transmits power to the sliding motor,
wherein the sliding motor is configured to provide power to the block,
wherein a first end of the trolley is positioned in a lower side of a second end of the trolley, and
wherein the plurality of segments are rotatably coupled to each other in a direction intersecting the length direction of the rail.

6. The display device of claim 5, wherein the plurality of segments comprise:
a first segment which forms the first end of the trolley, wherein the first segment has a pair of first joints formed in a first side and a second side of the first segment respectively; and
a second segment connected to the first segment; wherein the second segment has a pair of second joints formed in a first side and a second side of the second segment respectively,
wherein the pair of first joints are rotatably connected to the pair of second joints.

7. The display device of claim 6, wherein the first segment further comprises a second part having an edge formed in a curve,
wherein the second segment further comprises a first part having an edge formed in a straight line,
wherein the first part is in contact with the second part.

8. The display device of claim 5, wherein the rail further comprises a pair of ribs which protrudes from the inner surface of the body toward the internal accommodation space, and are spaced apart from each other with the trolley interposed therebetween.

9. The display device of claim 2, wherein the rail further comprises a pair of rails which extend in a front-rear direction, and are spaced apart from each other in a left-right direction, and
wherein the rod further comprises a pair of rods coupled to each of the pair of rails.

10. The display device of claim 1, further comprising:
a veil which is provided in the front surface of the moving wall, and covers at least a portion of a front of the display panel, wherein the veil is movable in an up-down direction; and
a motor which provides power to the veil,
wherein the controller controls a rotation direction and a rotation speed of the motor, and
wherein the controller adjusts a resolution or size of an image output from the display panel, according to a position of the veil in the up-down direction.

11. A display device comprising:
a first rail extending in a front-rear direction;
a second rail extending in the front-rear direction and spaced apart from the first rail in a left-right direction;
a moving wall extending in a direction intersecting the first rail and including a display panel;
a first rod which is positioned between the first rail and the moving wall, the first rod having a first end movably coupled to the first rail in a length direction of the first rail, and a second end fixed to the moving wall;
a second rod which is positioned between the second rail and the moving wall, the second rod having a first end movably coupled to the second rail in a length direction of the second rail, and a second end fixed to the moving wall;
a tilting motor configured to provide a rotational force to the first rod, the second rod, or the moving wall,
wherein the moving wall further comprises a pair of stoppers into which each of the first rod and the second rod is inserted, and which are disposed on a left or right side of each of the first rod and the second rod, and,
wherein the pair of stoppers are movable in an up-down direction in the moving wall, and the moving wall is rotatable about a rotation shaft of the tilting motor.

12. The display device of claim 11, further comprising a curved rail which is disposed between the first rail and the second rail, and extends along an arc having a vertical distance between the first rod and the second rod as a radius of curvature,
wherein the curved rail has a first end coupled to one of the first rail and the second rail and has a second end coupled to the other of the first rail and the second rail.

13. A display device comprising:
a rail which is elongated;
a moving wall extending in a direction intersecting the rail and including a display panel; and a rod positioned between the rail and the moving wall, the rod having a first end movably coupled to the rail in a length direction of the rail, and a second end fixed to the moving wall, wherein the moving wall is movable in the length direction of the rail, wherein the rail further comprises:
- a body defining an internal accommodation space extending in the length direction of the rail, the body having an opening through which the rod passes; and
- a block disposed in the internal accommodation space, and movable in the length direction of the rail, wherein the first end of the rod is fixed to the block, wherein the moving wall further comprises:
- an outer frame which forms a circumference of the moving wall, wherein the outer frame has a first outer frame forming a lower end of the outer frame and a second outer frame forming an upper end of the outer frame;
- a first end cover which is coupled to the first outer frame, and forms a lower end of the moving wall;
- a second end cover which is coupled to the second outer frame, and forms an upper end of the moving wall;
- a first lifting assembly which is provided in the moving wall, and moves the first end cover in an up-down direction; and
- a second lifting assembly which is provided in the moving wall, and moves the second end cover in the up-down direction.

14. The display device of claim 13, wherein the first lifting assembly comprises:
- a lifting motor which has a rotation shaft;
- a lead screw which is engaged with the rotation shaft of the lifting motor, and has a male thread formed on an outer circumferential surface;
- a pusher which has a female thread, which is engaged with the male thread of the lead screw, that is formed on an inner circumferential surface, and is able to linearly move in a left- right direction;
- a first link which has a first end fixed to the pusher;
- a first plate into which one end of the first link is inserted, and has a first slot which extends long in the left-right direction;
- a second plate which faces the first plate, is fixed to the first end cover, and has a second slot which extends long in the left-right direction; and
- a second link which has a first end fixed to the first plate, has a second end coupled to a second end of the first link, and is inserted into the second slot.

* * * * *